United States Patent
Qi et al.

(10) Patent No.: US 10,870,320 B2
(45) Date of Patent: Dec. 22, 2020

(54) HIGH FLOW DIRECT ACTING VALVE

(71) Applicant: Parker-Hannifin Corporation, Cleveland, OH (US)

(72) Inventors: Yufeng Qi, Grand Rapids, MI (US); Robert Brian Knepple, Kalamazoo, MI (US); Leonard Joseph Jabcon, Kalamazoo, MI (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 16/312,518

(22) PCT Filed: Jul. 11, 2017

(86) PCT No.: PCT/US2017/041474
§ 371 (c)(1),
(2) Date: Dec. 21, 2018

(87) PCT Pub. No.: WO2018/026472
PCT Pub. Date: Feb. 8, 2018

(65) Prior Publication Data
US 2019/0329603 A1 Oct. 31, 2019

Related U.S. Application Data

(60) Provisional application No. 62/370,051, filed on Aug. 2, 2016.

(51) Int. Cl.
*F16K 1/36* (2006.01)
*B60C 23/00* (2006.01)
(Continued)

(52) U.S. Cl.
CPC .............. *B60C 23/003* (2013.01); *F16K 1/36* (2013.01); *F16K 31/0655* (2013.01); *F16K 31/0686* (2013.01); *F16K 37/005* (2013.01)

(58) Field of Classification Search
CPC ........... Y10T 137/3584; Y10T 137/778; Y10T 137/86622
(Continued)

(56) References Cited

U.S. PATENT DOCUMENTS 802,642 A * 10/1905 Huxley ..................... F16K 1/46
251/332
874,652 A * 12/1907 Bailey ....................... F16K 1/46
137/516.29
(Continued)

FOREIGN PATENT DOCUMENTS

| DE | 102011055281 B3 | 2/2013 |
|---|---|---|
| WO | WO 2016020745 | 2/2016 |
| WO | WO 2016091974 | 6/2016 |

OTHER PUBLICATIONS

International Search Report of PCT/US2017/041474 dated Dec. 13, 2017.
(Continued)

*Primary Examiner* — Robert K Arundale
(74) *Attorney, Agent, or Firm* — Renner, Otto, Boisselle & Sklar, LLP

(57) ABSTRACT

A novel valve that may include a self-energizing seal member with a lobe extending toward a valve seat surface, a radially outwardly extending skirt, an axially extending nose, solenoid-operated three-position valve member, a pressure sense port, and/or a pressure pick-up opening. The features of the valve may allow the valve to operate at higher flow rates while requiring less energy to operate, may have a wider pressure and/or temperature operation range, may allow bidirectional fluid flow, may be less expensive to manufacture, and/or may enable a simple and compact assembly of the valve with a pressure sensor. The self-energizing seal member may include a base portion and the lobe extending may extend at an angle from the base portion
(Continued)

relative to a longitudinal axis. The lobe may reduce energy requirements to operate the valve compared to larger sealing contact area seals. For example, the lobe may have a small sealing area to allow the valve to be better balanced.

19 Claims, 11 Drawing Sheets

(51) Int. Cl.
*F16K 31/06* (2006.01)
*F16K 37/00* (2006.01)

(58) Field of Classification Search
USPC .................................................. 251/129.15
See application file for complete search history.

(56) References Cited

U.S. PATENT DOCUMENTS

| | | | | |
|---|---|---|---|---|
| 1,627,299 | A * | 5/1927 | Gemmel | F16K 1/46 |
| | | | | 251/357 |
| 2,678,187 | A * | 5/1954 | Peters | F16K 1/46 |
| | | | | 251/357 |
| 4,474,358 | A * | 10/1984 | Bennett | F16K 1/46 |
| | | | | 251/357 |
| 4,923,173 | A * | 5/1990 | Szymaszek | F16K 1/36 |
| | | | | 251/333 |
| 4,986,299 | A * | 1/1991 | Schultz | B60C 23/001 |
| | | | | 137/269 |
| 7,909,057 | B1 * | 3/2011 | Vicars | F16J 15/106 |
| | | | | 137/516.29 |
| 8,297,593 | B2 * | 10/2012 | Muzzo | F16K 1/02 |
| | | | | 251/332 |
| 2003/0052297 | A1 | 3/2003 | Enzaki et al. | |
| 2003/0079784 | A1 | 5/2003 | Toliusis | |
| 2008/0067461 | A1 * | 3/2008 | Petersen | F16K 31/0689 |
| | | | | 251/129.15 |
| 2010/0001222 | A1 * | 1/2010 | Muzzo | F16K 1/02 |
| | | | | 251/328 |
| 2014/0090719 | A1 * | 4/2014 | Mevius | F16K 17/02 |
| | | | | 137/15.24 |
| 2015/0144826 | A1 | 5/2015 | Bayyouk et al. | |
| 2017/0299077 | A1 * | 10/2017 | Jabcon | F16K 21/06 |
| 2017/0343115 | A1 * | 11/2017 | Glime, III | F16K 1/36 |
| 2018/0258927 | A1 * | 9/2018 | Lv | F04B 49/22 |

OTHER PUBLICATIONS

International Preliminary Report on Patentability of PCT/US2017/041474 dated Nov. 16, 2018.

* cited by examiner

HIGH FLOW DIRECT ACTING VALVE

RELATED APPLICATION DATA

This application is a national stage application pursuant to 35 U.S.C. § 371 of PCT/US2017/041474 filed on Jul. 11, 2017, which claims the benefit of U.S. Provisional Application No. 62/370,051 filed Aug. 2, 2016, the contents of which are incorporated herein by reference.

FIELD OF INVENTION

The present invention relates generally to valves, and more particularly to high flow direct acting valves for central tire inflation/deflation systems (CTIS).

BACKGROUND

A CTIS is a system that may provide control over the air pressure in each tire of a vehicle as a way to improve performance on different surfaces. For example, lowering the air pressure in a tire creates a larger area of contact between the tire and the ground and makes driving on softer ground much easier. It also does less damage to the surface of the ground and the tire. This is important for certain work sites, such as agricultural fields.

Drivers of vehicles with a CTIS may directly control pressure in each tire to enhance mobility of the vehicle based on the terrain. Also, the CTIS may maintain a desired pressure to counteract leaks in each tire.

CTIS's typically include an air supply source in selective fluid communication with a tire via a pneumatic conduit. The pneumatic conduit may include a tire-side valve that is fluidly connected to a pair of direct acting pneumatic valves. One of the direct acting pneumatic valves is often connected to an air supply source to provide pressurized air to the tire through the tire-side valve. The other direct acting pneumatic valve is often connected to ambient air to allow the tire to deflate by discharging pressurized air from within through the tire-side valve to the direct acting pneumatic valve to ambient air.

Three primary groups of general industrial direct acting pneumatic valves exist. The groups are based on the sizes and flow capabilities of the direct acting pneumatic valve (i.e., small, medium and large). Small valves typically have a valve body width of 10 to 15 mm, and typically have an effective flow orifice up to 1.5 mm in diameter. The small valves may have a flow coefficient Cv up to 0.05 or a flow rate of up to 50 Liter Per Minute (LPM). Medium valves typically have a valve body width between 15 to 22 mm, and typically have an orifice diameter up to 2.0 mm. The medium valves may have a flow coefficient Cv up to 0.10 or a flow rate of up to 100 LPM. Large valves typically have a valve body width above 22 mm, often about 33 mm, and typically have an orifice diameter up to 5.0 mm. The large valves may have a flow coefficient Cv of 0.5 or a flow rate of up to 300 LPM.

Some of the previously known valves are proportional valves or balanced valves. Proportional valves alter flow proportionally to an input signal, but the previously known proportional valves require a voice coil or proportional solenoid. Typically, direct acting pneumatic valves utilize an un-balanced design, which requires a high return spring force to overcome pressure force of fluid provided through an orifice (pressure force is the pressure multiplied by the area of the orifice). As a result, the size of the orifice has to be limited and the power to flow rate ratio is low. For example, a typical industrial 2-way direct acting valve has a 1.6 mm diameter orifice (Cv 0.1) and requires a 10 Watt coil to actuate. If a higher flow rate (e.g., orifice diameter larger than 5 mm) is required, the previously known un-balanced valves become impractical.

When higher flow rate is required, either a balanced design or a pilot operated valve will be typically used. Previously known pilot operated valves often have a longer response time, restrictive operation pressures, and are less robust compared to direct acting valves. Previously known direct acting valves also typically require greater power consumption to achieve the same flow rate as previously known pilot operated valves.

Some valves for applications other than CTIS's utilize a balanced design, but previously known balanced valves typically cannot operate outside of limited pressure ranges, temperature ranges, and voltage ranges, which renders the previously known balanced valves undesirable for CTIS's. For example, previously known balanced valves often are limited to operating between 0 to 125 pounds per square inch gage (psig) and between 32° F. to 125° F. Also, the previously known balanced valves are typically limited to an input voltage tolerance of −15% to +10% of a nominal voltage rated for general industry use.

SUMMARY OF INVENTION

The present invention provides a novel valve that may include a self-energizing seal member with a lobe extending toward a valve seat surface, a radially outwardly extending skirt, an axially extending nose, solenoid-operated three-position valve member, a pressure sense port, and/or a pressure pick-up opening. The features of the valve may allow the valve to operate at higher flow rates while requiring less energy to operate, may have a wider pressure and/or temperature operation range, may allow bidirectional fluid flow, may be less expensive to manufacture, and/or may enable a simple and compact manifold system design.

The self-energizing seal member may include a base portion and the lobe may extend at an angle from the base portion relative to a longitudinal axis. The lobe may reduce energy requirements to operate the valve compared to larger sealing contact area seals. For example, the lobe may have a small sealing area to allow the valve to be better balanced.

The base portion may allow the seal member to better endure wear and tear attributed to the seal member engaging and disengaging a valve seat of the valve. For example, the base portion may provide support for the lobe.

The valve member may include a radially outwardly extending skirt and/or an axially extending nose. The radially outwardly extending skirt may reduce the amount of energy required to open the valve when a relatively high pressure is present at a first port of the valve. The axially extending nose may reduce the amount of energy required to open the valve when a relatively high pressure is present at a second port of the valve.

The valve may not include a voice coil and may provide a closed state, an intermediately-open state, and a more fully open state. For example, the valve may include a pair of resilient members that operably connect to the valve member to require a relatively intermediate amount of force to open to the intermediately-open state, and to require a relatively high amount of force to open from the intermediately-open state to the more fully open state.

The pressure sense port may be disposed at an end of the valve opposite the valve seat. The pressure sense port may allow the valve to easily connect to a pressure sensor. For example, the pressure sense port may be adjacent to an electrical connector to respectively connect to a pressure sensor adjacent an electrical outlet in a circuit board. The resulting assembly of the valve and the circuit board may be more compact than previously known valves connected to pressure sensors.

The valve member may include a pressure pick-up opening that is exposed to a reduced pressure when the valve member is opened. The pressure pick-up opening may be fluidly connected to a second axial end of the valve member opposite the pressure pick-up opening to reduce the force required to open the valve member when the pressure in an inlet of the valve is greater than the pressure of the outlet.

The self-energizing seal, the skirt, the nose, the pair of resilient members, and the pressure sense port may be independently combined with one another or utilized separated. The self-energizing seal, the skirt, the pair of resilient members, and the pressure sense port, and the pressure pick-up opening may be independently combined with one another or utilized separated. Thus, a valve according to the present invention may include all of, any one of, or any combination of the self-energizing seal, the skirt, the nose, the pair of resilient members, and the pressure sense port, or all of, any one of, or any combination of the self-energizing seal, the skirt, the pair of resilient members, the pressure sense port, and the pressure pick-up opening.

According to one aspect of the invention, a valve may include a valve housing including a first inlet/outlet and a second inlet/outlet, a valve seat having a valve seat surface that circumscribes a longitudinal axis, and a valve member that is moveable along the longitudinal axis. The valve member includes a first axial end that faces the valve seat surface and a second axial end that faces away from the first axial end. When the valve member is in an open position, the first inlet/outlet and the second inlet/outlet are fluidly connected, and when the valve member is in a closed position, the first inlet/outlet and the second inlet/outlet are fluidly disconnected, a cavity that is defined by the first axial end facing toward the valve seat surface. The valve may include a self-energizing sealing member that circumscribes the longitudinal axis, includes a base portion, and includes a lobe extending from the base portion at an angle relative to the longitudinal axis to seal against the valve seat surface when the valve member is in the closed position. The base portion is at least partially disposed within the cavity and includes a lobe end that is a portion of the lobe that extends beyond the cavity. When the valve member is in the open position a length of the base portion perpendicular to the valve seat surface, is greater than a length of the lobe end perpendicular to the valve seat surface.

According to another aspect of the invention, a valve may include a valve housing including a first inlet/outlet and a second inlet/outlet, a valve seat having a valve seat surface that circumscribes a longitudinal axis, and a valve member that is moveable along the longitudinal axis. The valve member includes a first axial end that faces the valve seat surface and a second axial end that faces away from the first axial end. When the valve member is in an open position, the first inlet/outlet and the second inlet/outlet are fluidly connected, and when the valve member is in a closed position, the first inlet/outlet and the second inlet/outlet are fluidly disconnected. The valve member may include a radially outwardly extending skirt that circumscribes the longitudinal axis and is disposed axially between a valve seat engaging surface of the first axial end and the second axial end of the valve member. When a pressure at the second inlet/outlet is lower than a pressure at the first inlet/outlet, and the valve member opens, a high pressure zone forms adjacent the skirt axially between the skirt and the valve seat surface to reduce an amount of force needed to open the valve member.

According to another aspect of the invention, a valve may include a valve housing including a first inlet/outlet and a second inlet/outlet, a valve seat having a valve seat surface that circumscribes a longitudinal axis, and a valve member that is moveable along the longitudinal axis. The valve member includes a first axial end that faces the valve seat surface and a second axial end that faces away from the first axial end. When the valve member is in an open position, the first inlet/outlet and the second inlet/outlet are fluidly connected, and when the valve member is in a closed position, the first inlet/outlet and the second inlet/outlet are fluidly disconnected. The valve member may include an axially extending nose that defines a flow path that extends from an opening in the first axial end towards the second axial end to allow fluid to flow within the nose, and the nose extends axially away from the second axial end of the valve member beyond a focal point. The focal point is defined by an intersection of imaginary projection lines that extend along flow paths formed between the valve member and the valve seat surface. When a fluid within the second inlet/outlet has a pressure that is higher than a pressure of fluid within the flow path defined by the nose, and the valve member opens, a high pressure zone forms in the first inlet/outlet about the nose and the flow path receives lower pressure fluid from a low pressure zone that is axially beyond the high pressure zone and that is adjacent the opening in the nose to prevent an increase in the amount of force needed to open the valve member.

According to another aspect of the invention, a valve may include a valve housing including a first inlet/outlet and a second inlet/outlet, a valve seat having a valve seat surface that circumscribes a longitudinal axis, and a valve member that is moveable along the longitudinal axis. The valve member includes a first axial end that faces the valve seat surface and a second axial end that faces away from the first axial end. When the valve member is in an open position, the first inlet/outlet and the second inlet/outlet are fluidly connected, and when the valve member is in a closed position, the first inlet/outlet and the second inlet/outlet are fluidly disconnected, a solenoid that is operably coupled to the valve member. The open position is an intermediately-open position and the valve member is moveable from the closed position to the intermediately-open position and from the intermediately-open position to a second open position that is further from the valve seat surface than the intermediately-open position. The valve may include a first resilient member that biases the valve member toward the valve seat surface, and a second resilient member that biases the valve member toward the valve seat surface when the valve member is between the intermediately-open position and the second open position. When the valve member is in the intermediately-open position, the second resilient member compresses as the valve member moves toward the second open position, thereby causing an abrupt increase in force needed to advance the valve member toward the second open position.

According to another aspect of the invention, a valve may include a valve housing including a first inlet/outlet and a second inlet/outlet, a valve seat having a valve seat surface that circumscribes a longitudinal axis, and a valve member that is moveable along the longitudinal axis. The valve member may include a first axial end that faces the valve seat surface and a second axial end that faces away from the first axial end. When the valve member is in an open position, the first inlet/outlet and the second inlet/outlet are fluidly connected, and when the valve member is in a closed position, the first inlet/outlet and the second inlet/outlet are fluidly disconnected. The valve may include a pressure sense port in the valve housing. The pressure sense port is axially opposite the first axial end of the valve member and is fluidly connected to a flow path of the valve member that extends from the first axial end toward the second axial end to allow fluid to flow through the valve member when the valve member moves between the open position and the closed position.

According to another aspect of the invention, a valve may include a valve housing including a first inlet/outlet and a second inlet/outlet, a valve seat having a valve seat surface that circumscribes a longitudinal axis, a valve member that is moveable along the longitudinal axis. The valve member includes a first axial end that faces the valve seat surface and a second axial end that faces away from the first axial end. When the valve member is in an open position, the first inlet/outlet and the second inlet/outlet are fluidly connected, and when the valve member is in a closed position, the first inlet/outlet and the second inlet/outlet are fluidly disconnected. The valve member includes a pressure pick-up opening. When a pressure at the first inlet/outlet is greater than a pressure at the second inlet/outlet and the valve member opens the pressure pick-up opening is exposed pressure that is less than the highest pressure present in the first inlet/outlet.

The foregoing and other features of the invention are hereinafter described in greater detail with reference to the accompanying drawings.

DETAILED DESCRIPTION

The principles of this present application have particular application to CTIS valves for allowing inflation and deflation of vehicle tires, and thus will be described below chiefly in this context. It will be appreciated that principles of this may be applicable to other pneumatic or hydraulic systems where it is desirable to supply and/or discharge fluid, such as vehicle suspension systems (e.g., leaning functions), independent row control for agricultural customers, or assembly line devices.

Figure 1:
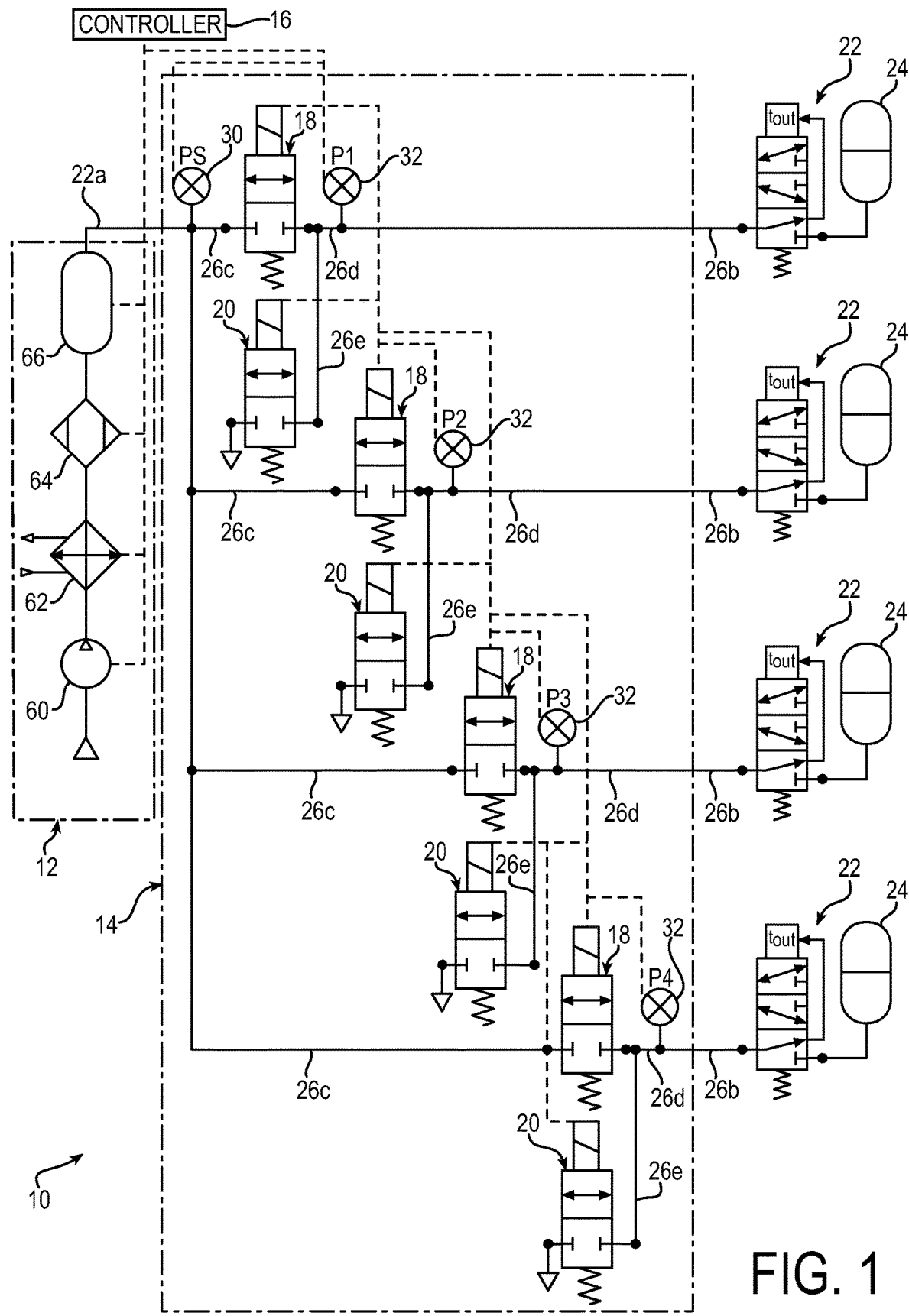
FIG. 1 is a schematic view of a central tire inflation/deflation system of a vehicle including a plurality of exemplary valves in a closed state fluidly disconnecting each of a plurality of vehicle tires from a pressure source and from atmosphere.

Referring now in detail to the drawings, and initially to FIG. 1, a portion of a vehicle with a central tire inflation/deflation system 10 is illustrated schematically. The central tire inflation/deflation system 10 may include a pressure source 12, a control system 14, a controller 16 that may control the pressure source 12 and/or the control system 14, four supply valves 18, four vent valves 20, four wheel valves 22, four of fluid reservoirs, such as four vehicle tires 24, and one or more fluid flow lines 26a-26b.

The controller 16 may include a computer processor and a memory device to operate the pressure source 12 and the control system 14. Operation of the pressure source 12 and the control system 14 allows the controller 16 to control fluid flow from the pressure source 12 into and out of each vehicle tire 24.

Communication lines, illustrated as dashed lines, may operably connect the controller 16 to various components of the pressure source 12 and the control system 14 to allow the controller 16 to operate the pressure source 12 and the control system 14. For example, the communication lines may allow electrical impulses to be communicated. In an embodiment, the communication lines are able to carry electrical signals to and from the controller.

The control system 14 may include one or more fluid flow lines 26c-26e, the four supply valves 18, the four vent valves 20, a supply pressure sensor 30, and four of inflation/deflation pressure sensors 32.

The controller 16 may operate each supply valve 18 and/or vent valve 20 to be in a closed state or an open state. The controller 16 may open or close the supply valves 18 or to the vent valves 20, and the opening or closing may require less energy compared to previously known transportation valves. For example, each supply valve 18 and/or vent valve 20 may be identical to one another and may include a pressure sense port 40 (shown in FIG. 2), a seal member 42 with a lobe 44 (shown in FIG. 3), a nose 46 (shown in FIG. 3), and/or a skirt 48 (shown in FIG. 3).

Each fluid flow line 26c-26e may fluidly connect each supply valve 18 and each vent valve 20 to at least one of the pressure source 12 or to the wheel valve 22. Each fluid flow line 26c may fluidly connect the inlet of the corresponding supply valve 18 to the outlet of the pressure source 12. For example, each fluid flow line 26c may fluidly connect to the fluid flow line 26a. The supply pressure sensor 30 may be operably connected to each fluid flow line 26c, which may fluidly connect the outlet of the pressure source 12 and the inlet of each supply valve 20. The supply pressure sensor 30 may be in communication with the controller 16 to provide the controller 16 with a reading of the pressure of the pressurized fluid provided by the pressure source 12.

Each fluid flow line 26d may fluidly connect the outlet of the corresponding supply valve 18 to the corresponding wheel valve 22. For example, each fluid flow line 26*d* may fluidly connect to the corresponding fluid flow line 26*b*.

Each supply valve 18 may be in communication with the controller 16 via the communication lines. When the system reservoir 66 holds pressurized fluid the pressurized fluid may be provided to the wheel valve 22 when the controller 16 opens the corresponding supply valve 18. Providing pressurized fluid to each wheel valve 22 allows the corresponding vehicle tire 24 to inflate when the wheel valve 22 is in the open state. More than four supply valves may be provided. Alternatively, less than four supply valves may be provided.

Each fluid flow line 26*e* may fluidly connect the corresponding vent valve to each corresponding wheel valve 22. For example, each fluid flow line 26*e* may fluidly connect to the corresponding fluid flow line 26*d* to fluidly connect to the outlet of the corresponding vent valve 20.

Each vent valve 20 may be in communication with the controller 16 via the communication lines and fluidly connected with the corresponding wheel valve 22 via the corresponding fluid flow lines 26*b*, 26*d*, 26*e*. The controller 16 may open each vent valve 20 independently to fluidly connect the corresponding wheel valve 22 with ambient air. More than four vent valves may be provided. Alternatively, less than four vent valves may be provided.

Each inflation/deflation pressure sensor 32 may be operably connected to the corresponding fluid flow line 26*d*, which may fluidly connect the corresponding wheel valve 22 with the corresponding supply valve 18 and/or the corresponding vent valve 20. The inflation/deflation pressure sensor 32 may be in communication with the controller 16 to provide the controller 16 with a reading of the pressure of fluid flowing between each supply valve 18 and the corresponding wheel valve 22. More than four inflation/deflation pressure sensors may be provided. Alternatively, less than four inflation/deflation pressure sensors may be provided.

Opening each wheel valve 22 and vent valve 20 allows each vehicle tire 24 to provide pressurized fluid through the corresponding fluid flow line 26*b* to the control system 14 where the pressurized fluid may be expelled through the corresponding vent valve 20. The pressurized fluid may flow into each wheel valve 22 and through the corresponding fluid flow line 26*b* to the corresponding fluid flow line 26*e*. From the corresponding fluid flow line 26*e*, the pressurized fluid may flow to the corresponding vent valve 20 and may be exhausted by the corresponding vent valve 20, which may cause deflation of the vehicle tire 24.

Each wheel valve 22 may be any suitable wheel valve, such as the wheel valve described in Application No. PCT/US2015/052713 filed Sep. 28, 2015 and titled CENTRAL TIRE INFLATION/DEFLATION SYSTEM WITH A TIMED FUNCTION CTIS WHEEL VALVE, which claims the benefit of U.S. Provisional Application No. 62/056,207 filed Sep. 26, 2014, both of which are incorporated herein by reference.

The pressure source 12 may include a fluid pump 60, such as a pneumatic compressor, a cooler 62, an air dryer 64, and a system reservoir 66 to provide pressurized air to the control system 14.

For example, the system reservoir 66 may hold pressurized fluid until the controller 16 instructs the system reservoir 66 discharge the pressurized fluid from an outlet of the system reservoir 66 to provide the pressurized fluid to an inlet of the control system 14 for inflating the corresponding vehicle tire 24.

When the controller opens each supply valve 18 and closes the corresponding vent valve 20, the pressurized fluid from the pressure source 12 may flow to the corresponding wheel valve 22. Each supply pressure sensor 30 and the corresponding inflation/deflation pressure sensor 32 may provide the pressure readings to the controller 16.

The controller 16 may be configured to determine whether the wheel valve 22 should to be opened and to determine whether the vehicle tire 24 should be inflated or deflated. For example, the controller 16 may have an input (not shown) for a user to select the predetermined pressure level for each vehicle tire 24. The controller 16 may operate the pressure source 12 and the control system 14 to inflate or deflate each vehicle tire 24 to reach the selected predetermined pressure level.

Once the pressure level within the vehicle tire 24 is determined, the controller 16 may determine whether the supply valve 18 and the wheel valve 22, or the vent valve 20 and the wheel valve 22 should be re-opened to either inflate or deflate, respectively, the vehicle tire 24 based on a comparison of the selected pressure level for the vehicle tire 24 compared to the pressure level of the vehicle tire 24 determined by the controller 16.

If the determined pressure level is below the selected pressure level, the controller 16 may open the wheel valve 22, the system reservoir 66, and the supply valve 18 to inflate the vehicle tire 24.

If the determined pressure level is above the selected pressure level, the controller 16 may open the wheel valve 22 and the corresponding vent valve 20 to deflate the corresponding vehicle tire 24. While the wheel valve 22 is in the open state, the controller 16 may adjust and/or maintain the fluid flow from the pressure source 12 to maintain the pressure of the pressurized fluid at a pressure below the opening pressure threshold and below the determined pressure of fluid within the vehicle tire 24 to deflate the vehicle tire 24. The controller 16 may keep the wheel valve 22 open or re-open the wheel valve 22 until the pressure of the fluid inside the vehicle tire 24 reaches the selected pressure level. In an embodiment, the controller may keep the keep the valve open or re-open the valve until the pressure of the fluid inside the vehicle tire reaches ambient air pressure.

Figure 2:
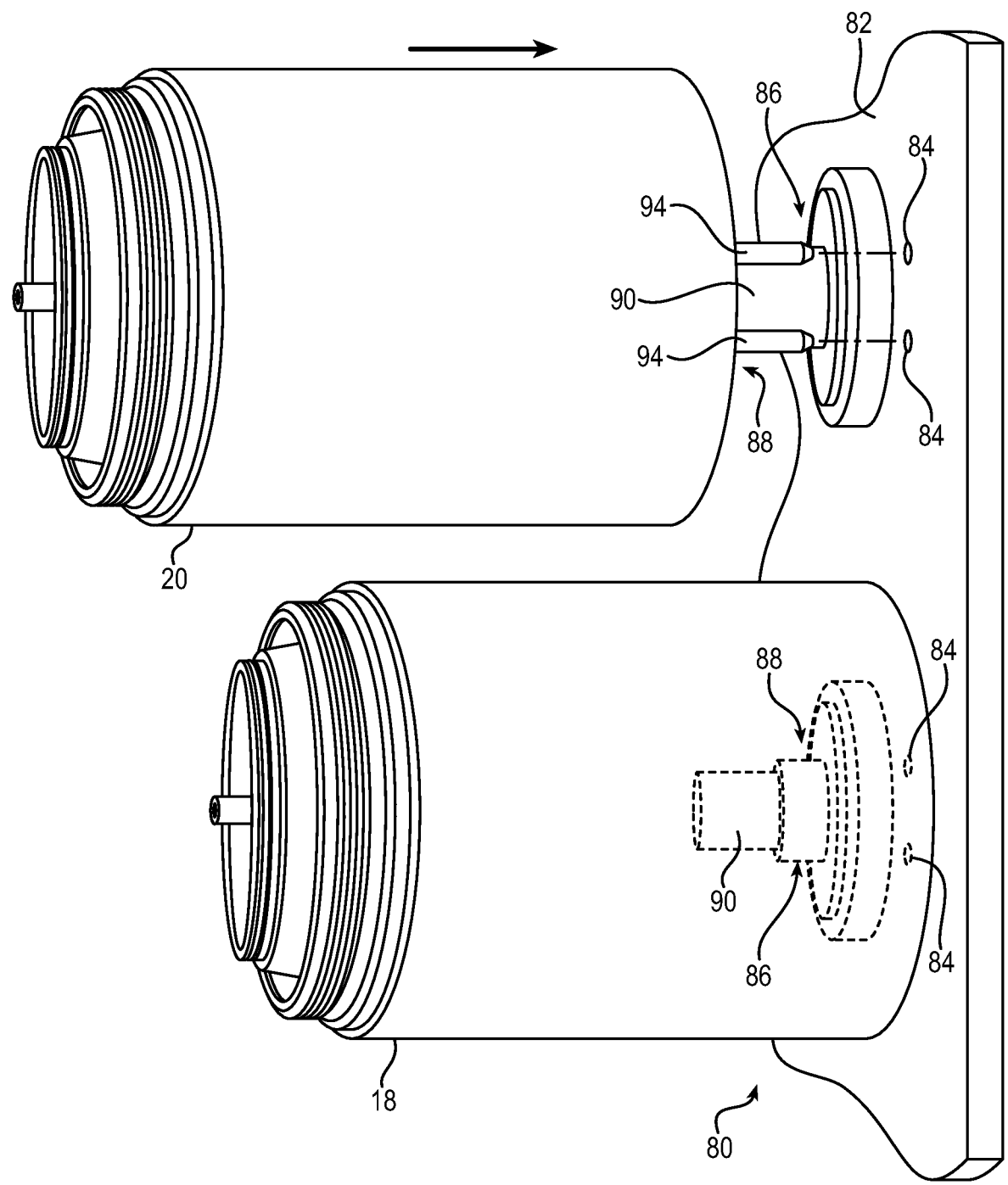
FIG. 2 is an oblique view of an exemplary valve assembly including two of the valves of FIG. 1 and an exemplary circuit board.

Referring to FIG. 2, the control system 14 may include a valve assembly 80 that includes a circuit board 82 and the supply valve 18 and the vent valve 20 (hereinafter referred to as the valves 18 and 20, respectively). For example, the circuit board 82 may include a plurality of power receptacles 84 for providing power to the valves 18 and 20, and may include a plurality of pressure sense port connectors 86 for receiving pressure from each valve 18 and 20.

Each valve 18 and 20 may include a pressure sense port 88 (shown best in FIG. 3) to connect with the corresponding pressure sense port connector 86. The pressure sense port 88 allows for a more compact assembly size of the valve 18 or 20 and the circuit board 82 compared to previously known proportional or balanced valves connected to previously known pressure sensors. In an embodiment, the circuit board includes more than two pressure sense port connectors. For example, the circuit board may include eight or sixteen pressure sense port connectors.

Each pressure sense port connector 86 may include a nipple 90 that is secured within the corresponding pressure sense port 88 of each valve 18 and 20. For example, each pressure sense port 88 may receive the corresponding nipple 90 to provide internal valve pressure to a pressure sensor 92 (shown schematically in FIG. 3) that is fluidly connected to the pressure sense port 88 through an orifice (not shown) in the nipple 90.

Each valve 18 and 20 may include an electrical connector, such as a prong 94, at an end of the valve 18 or 20 adjacent to the circuit board 82 for engaging the corresponding power receptacle 84. The power receptacles 84 may receive the prong 94 to provide power to and/or to communicate with each valve 18 and 20. The valves 18 and 20 may include two or more prongs 94 to connect to the power receptacles 84.

Figure 3:
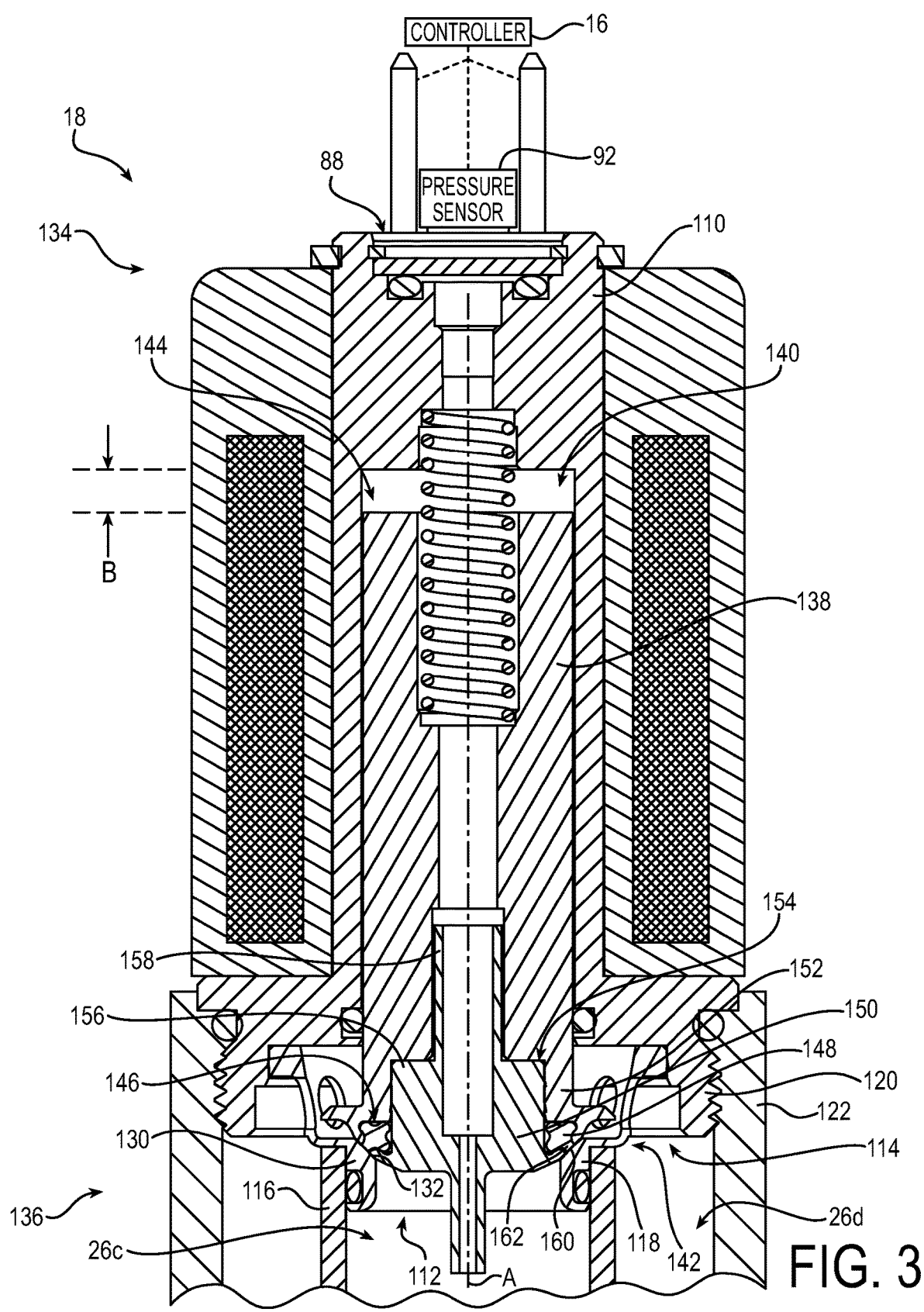
FIG. 3 is a cross-sectional view of one of the valves of FIG. 2 in a closed state.
Figure 5:
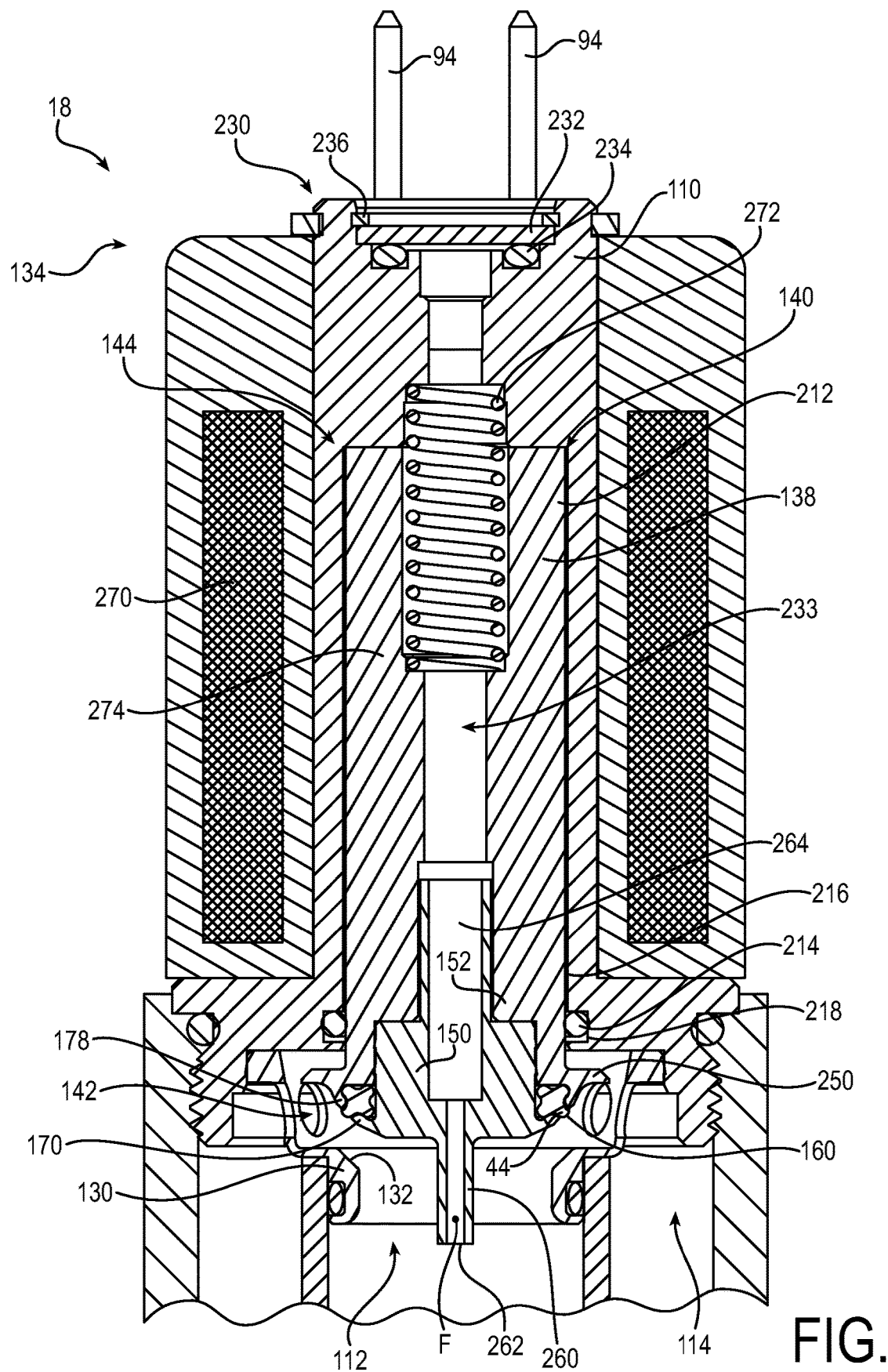
FIG. 5 is a cross-sectional view of the valve of FIG. 3 in an open state.

A progression of the valve 18 opening is illustrated in FIGS. 3 and 5. FIG. 3 illustrates the valve 18 in the closed state where fluid is prevented from flowing through the valve 18. FIG. 5 illustrates the valve 18 in the open state where fluid is allowed to flow through the valve 18.

Referring now to FIG. 3, the valve 18, which may be identical to the valve 20, may include a valve housing 110 with a first inlet/outlet 112 and a second inlet/outlet 114. The first inlet/outlet 112 may circumscribe a longitudinal axis A. For example, the first inlet/outlet 112 may be cylindrical for insertion into an inner female connector 116 that forms a portion of the fluid flow line 26c.

Referring again to FIG. 3, the first inlet/outlet 112 may be fluidly connected to fluid flow line 26c. For example, the fluid flow line 22c may be partially formed by a cylindrical tube that is engageable with an axially extending neck 118 of the valve housing 110 to be in fluid communication with the first inlet/outlet 112.

The second inlet/outlet 114 may circumscribe the longitudinal axis A and may be radially outwardly from the first inlet/outlet 114. The second inlet/outlet 114 may be partially defined by a cylindrical neck 120 that is insertable into an outer female connector 122 that forms a portion of the fluid flow line 26d. For example, the cylindrical neck 120 may be threaded that engage threads of the outer female connector 122 to fix the outer female connector 122 to the neck 120.

When the outer female connector 122 is fixed to the neck 120, the second inlet/outlet 114 may be fluidly connected to the fluid flow line 26d and the first inlet/outlet 112 may be fluidly connected to the fluid flow line 26c. For example, the inner female connector 116 and the outer female connector 122 may be fixed to one another (not shown).

The valve housing 110 may form a valve seat 130 having a valve seat surface 132 that circumscribes the longitudinal axis A. The valve seat may be inclined relative to the longitudinal axis A and face axially in a first axial direction toward a back end 134 away from a front end 136 of the valve 18. The valve seat surface 132 may be frustoconical. For example, the valve seat surface 132 may extend at a 45° angle from the longitudinal axis A. The valve seat surface 132 may extend at an angle anywhere from 30° to 90°.

The valve 18 may include a valve member 138 disposed within a piston chamber 140 defined by the valve housing 110. The valve member 138 may include a first axial end 142 that faces the valve seat surface 132 and a second axial end 144 that faces in the first direction away from the first axial end 142.

When the valve seat angle is 45°, the first axial end 142 may be self-centering. Self-centering the first axial end 142 allows the first axial end 142 to seal against the valve seat surface 132 when the first axial end 142 is initially misaligned with the valve seat surface 132.

When the valve seat angle is less than 45° the valve 18 may require more longitudinal displacement of the valve member 138 to provide the same fluid flow rate. For example, when the valve seat angle is 45°, the valve may have an opening based on the longitudinal displacement of the valve member 138 multiplied by sin(45°) (i.e., 0.71 times the longitudinal displacement). Alternatively, when the valve seat angle is 30°, the valve may have an opening based on the longitudinal displacement of the valve member 138 multiplied by sin(30°) (i.e., 0.5 times the longitudinal displacement).

Figure 4:
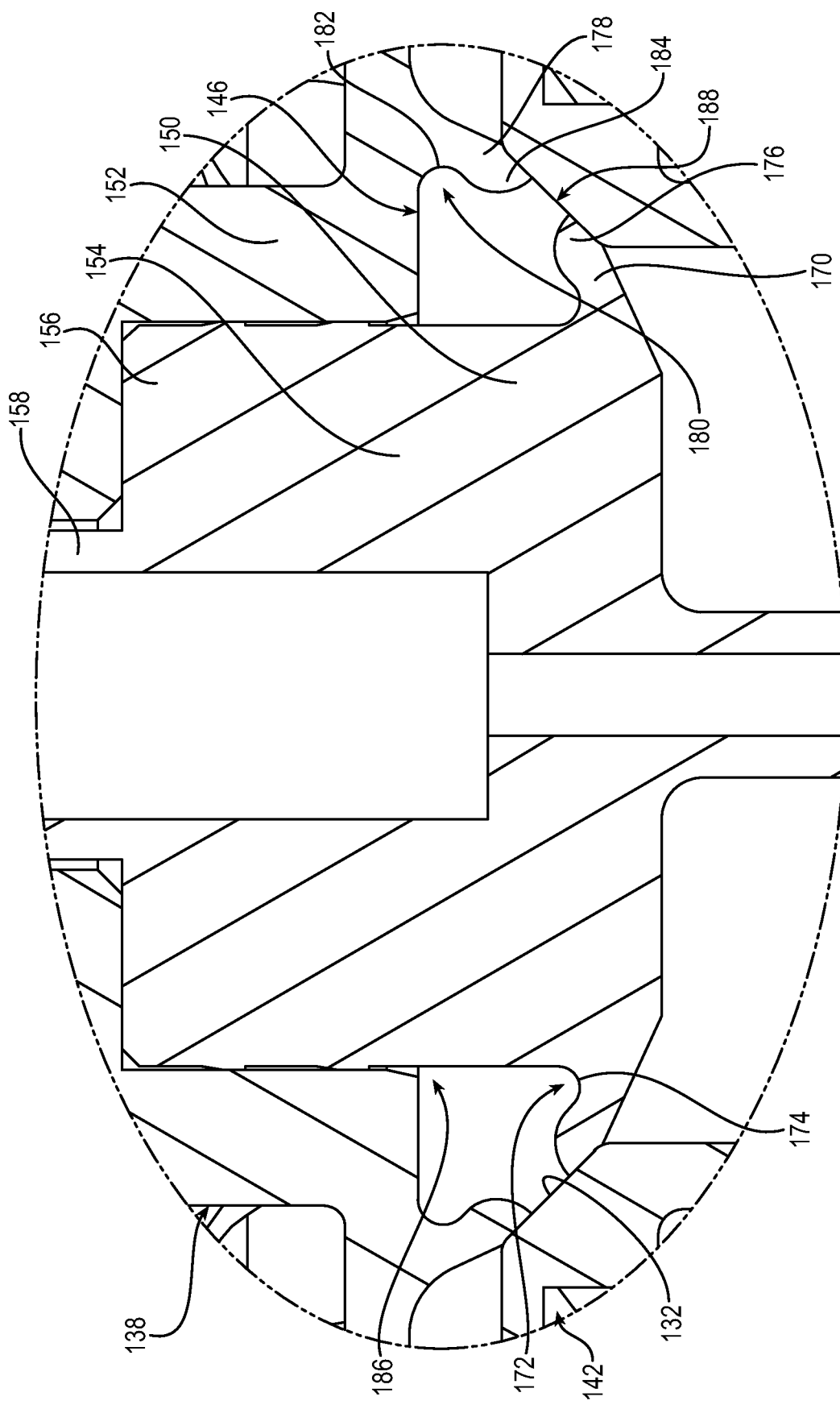
FIG. 4 is an enlarged cross-sectional view of the valve of FIG. 3 without a sealing member.

Referring to FIG. 3 and additionally to FIGS. 4 and 5, the first axial end 142 may include a cavity 146 (shown best in FIG. 4) that is defined by the first axial end 142 facing toward the valve seat surface 132. The cavity 146 may partially house a valve seal 148 (shown in FIG. 3) that is engageable with the valve seat surface 132. For example, a lobe end 160 (shown best in FIG. 5) of a portion of a lobe 44 (shown best in FIG. 5) of the valve seal 148 may extend beyond the cavity 146, as discussed further below.

Referring now to FIG. 4, the cavity 146 may circumscribe the longitudinal axis A and face toward the valve seat surface 132. For example, the cavity 146 may face radially away from the longitudinal axis A and face axially toward the valve seat surface 132.

The valve member 138 may include a front end body 150 and a rear end body 152 that together define the cavity 146. The front end body 150 may be disposed within the rear end body 152 to fix the front end body 150 to the rear end body 152. The front end body 150 may be press-fit or adhered to a radially inner surface of the rear end body 152 that circumscribes a rear portion 154 of the front end body 150. For example, the rear end body 148 may include a counter-bored hole and the rear portion 154 may include a wide cylindrical portion 156 and a narrow cylindrical portion 158 that are press-fit into the counterbored hole. In an embodiment, the front end body may be fixed to the rear end body with any other suitable connection. For example, the front end body may include radially outward facing threads that engage with radially inward facing threads of the rear end body, an adhesive may adhere the front end body to the rear end body, or the rear end body and the front end body may be crimped together.

The front end body 150 may form a radially outwardly extending flange 170 that circumscribes the longitudinal axis at an angle. The radially outwardly extending flange 170 may partially define a radially inner seal retaining portion 172 of the cavity 146 that extends tangential to the valve seat surface 132 toward the longitudinal axis A. For example, a radially outer surface of the rear portion 154 and the radially outwardly extending flange 170 may define a radially outwardly facing groove 174.

The radially outwardly extending flange 170 may include an annular protrusion 176 that extends away from the valve seat surface 132. The annular protrusion 176 may be rounded to support the valve seal 148 (shown in FIG. 3). The rear end body 152 may form a radially inwardly extending flange 178 that circumscribes the longitudinal axis A at an angle. The radially inwardly extending flange 178 may partially define a radially outer seal retaining portion 180 of the cavity 146 that extends tangential to the valve seat surface 132 and away from the radially inner seal retaining portion 172. A radially inward extending ledge of the rear end body 152 and the radially inwardly extending flange 178 may define a radially inwardly facing groove 182.

The radially inwardly extending flange 178 may include an annular protrusion 184 that extends away from the valve seat surface 132. The annular protrusion 184 may be rounded to support the valve seal 148 (shown in FIG. 3).

The cavity 146 may include an intermediate annular seal retaining portion 186 that may extend radially inward of the radially outer seal retaining portion 180, and may extend axially away from the radially inner seal retaining portion 172 in the first axial direction.

The radially inwardly extending flange 178 may extend toward the radially outwardly extending flange 170 to define a slit 188. The slit 188 may be disposed radially between the radially inner seal retaining portion 172 and the radially outer seal retaining portion 180. For example, the cavity 146 and the slit 188 may together form a spade-shaped cross-section.

The slit 188 may circumscribe the longitudinal axis A and may extend at an angle relative to the longitudinal axis A. For example, the slit 188 may extend perpendicular to the to the valve seat surface 132.

Figure 6:
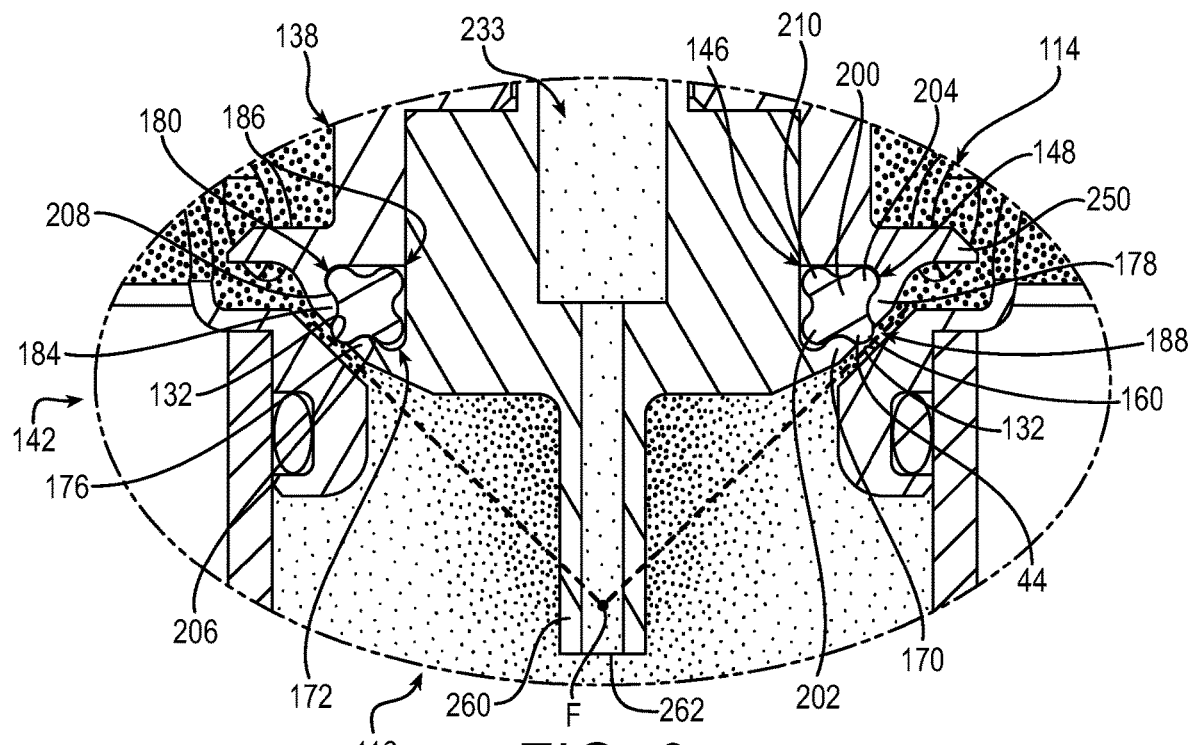
FIG. 6 is an enlarged view of the cross-sectional view of a nose of the valve of FIG. 3 in a partially open state.
Figure 7:
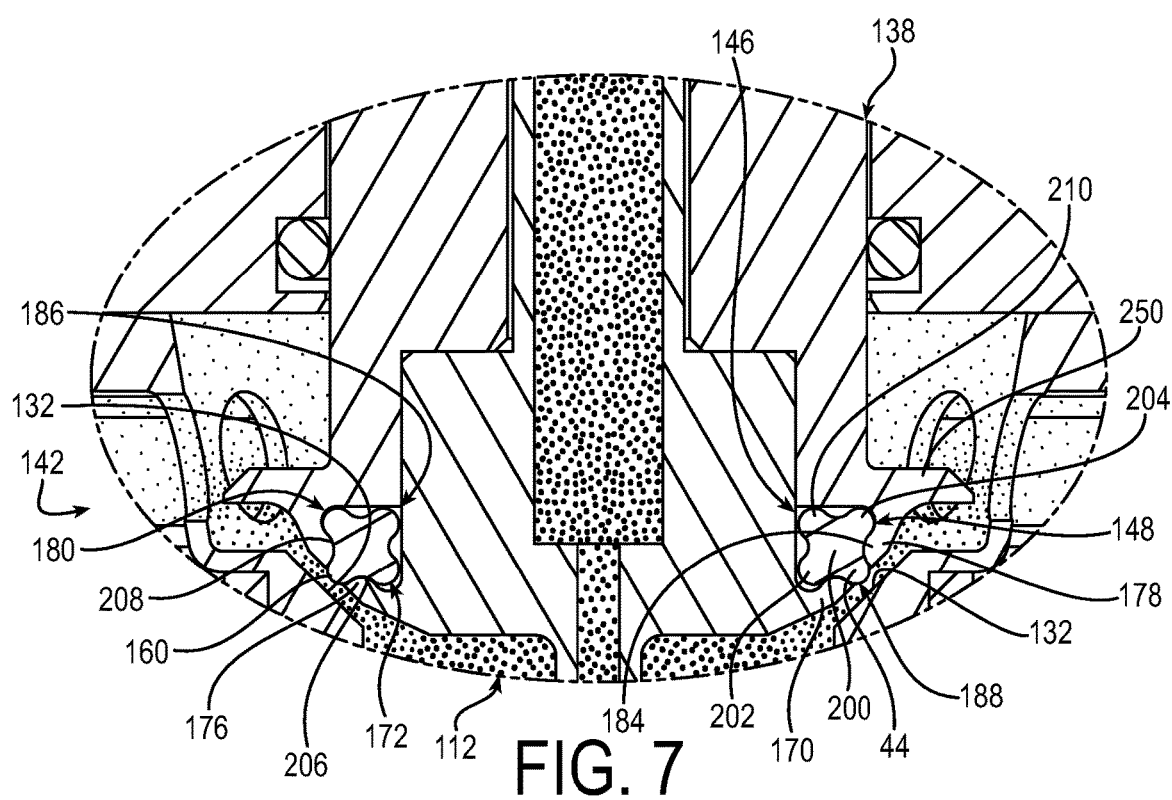
FIG. 7 is an enlarged view of the cross-sectional view of a skirt of the valve of FIG. 3 in a partially open state.

Referring to FIGS. 6 and 7, the valve seal 148 may circumscribe the longitudinal axis A to seal against the valve seat surface 132. For example, the valve seal 148 may include a base portion 200 that is held within the cavity 146 and the lobe 44 may extend from the base portion 200 toward the valve seat surface 132. The lobe 44 may extend at an angle relative to the longitudinal axis A, such as through the slit 188 perpendicular to the valve seat surface 132.

The base portion 200 may be disposed within the cavity 146 adjacent to the radially outwardly extending flange 170 and the radially inwardly extending flange 178. For example, the base portion 200 may include a radially inner lobe 202 and a radially outer lobe 204 opposite the radially inner lobe 202.

The radially inner lobe 202 may be disposed within the radially inner seal retaining portion 172. The radially inner lobe 202 may provide structural support for the lobe 44 to mitigate wear and tear to increase the lifespan and effectiveness of the lobe 44 to seal against the valve seat surface 132. For example, a radially inner concave surface of the base portion 206 may engage the annular protrusion 176 to secure the base portion 200 within the cavity 146.

The radially outer lobe 204 may be disposed within the radially outer seal retaining portion 180. The radially outer lobe 204 further may provide structural support for the lobe 44 to mitigate wear and tear to increase the effectiveness of the lobe 44 to seal against the valve seat surface 132. For example, a radially outer concave surface of the base portion 208 may engage the annular protrusion 184 to secure the base portion 200 within the cavity 146.

The lobe end 160 of the lobe 44 may protrude from the first axial end 142 toward the valve seat surface 132. For example, the lobe end 160 may extend radially outwardly at an angle from the longitudinal axis A through the slit 188 to protrude beyond the radially outwardly extending flange 170 and the radially inwardly extending flange 178.

The lobe end 160 may extend perpendicular to either or both the radially inner lobe 202 and the radially outer lobe 204. For example, the lobe end 160 may extend at a 45° relative to the longitudinal axis A to form a T-shape with the radially inner lobe 202 and the radially outer lobe 204. In an embodiment, the radially inner lobe and the radially outer lobe do not extend diametrically opposite one another.

When the valve member 138 is in the open position a length of the base portion 200 perpendicular to the valve seat surface 132, is greater than a length of the lobe end 160 perpendicular to the valve seat surface 132. For example, the entire lobe end 160 may protrude beyond the flanges 170 and 178 to engage the valve seat surface 132.

The base portion 200 and the lobe 44 may allow the valve seal 148 to be a self-energizing sealing member. For example, the lobe 44 may engage the valve seat surface 132 when closed and a high pressure (shown in FIG. 6) is at the first inlet/outlet 112, the pressure may encourage the lobe 44 to seal against the valve seat surface 132 and against the radially inwardly extending flange 178. When closed and a high pressure (shown in FIG. 5) is at the second inlet/outlet 114, the pressure may encourage the lobe 44 to seal against the valve seat surface 132 and against the radially outwardly extending flange 170.

The valve seal 148 may include an intermediate lobe 210 that may extend away from the lobe end 160. Together the intermediate lobe 210, the base portion 200, and the lobe 44 may form an x-ring seal. For example, the intermediate lobe 210 may extend diametrically away from the lobe end 160, and may extend perpendicular to the radially inner lobe 202 and the radially outer lobe 204.

The intermediate lobe 210 may be disposed within the intermediate annular seal retaining portion 186 to provide additional structural support to the lobe 44. In an embodiment, the valve seal does not include an intermediate lobe. For example, the cavity and the valve seal may form a T-shape perpendicular to the valve seat surface.

Referring again to FIG. 5, the valve member may be moveable along the longitudinal axis A within the piston chamber 140. For example, the valve member 138 may include a cylindrical piston portion 212 and the piston chamber 140 may be cylindrical to allow the piston portion 212 to axially slide within the piston chamber 140.

The valve may include a piston seal 214 to seal against a radially outwardly facing surface 216 of the piston portion 212. For example, the piston seal 214 may be an o-ring disposed within a radially inwardly facing groove 218 of the valve housing 110 to prevent axial movement of the o-ring.

The radially outwardly facing surface 216 may be axially aligned with the lobe end 160 when the valve member 138 is closed (shown in FIGS. 3 and 4). For example, the lobe end 160 and the radially outwardly facing surface 216 may be coaxial and may each have a circular perimeter with substantially the same length. When the valve member 138 is closed the lobe end 160 may form a seal against the valve seat surface 132 that extends slightly radially inward and slightly radially outward of the radially outwardly facing surface 216. In an embodiment, the lobe end does not extend radially outward of the radially outwardly facing surface or does not extend radially inward of the radially outwardly facing surface.

Axially aligning the radially outwardly facing surface 216 and the lobe end 160 allows the valve member 138 to move substantially independent of the pressure at the second inlet/outlet 114. For example, a high pressure at the second inlet/outlet 114 port (shown best in FIG. 6) may exert substantially the same force in the first longitudinal direction as the second longitudinal direction. In an embodiment, pressure at the second inlet/outlet exerts a force in the first longitudinal direction that is equal to a force in the second longitudinal direction.

Axially aligning the radially outwardly facing surface 216 and the lobe end 160 allows the valve member 138 to move substantially independent of the pressure at the first inlet/outlet 112. For example, the valve 18 may be a balanced valve to allow pressure at the first inlet/outlet 112 adjacent to the first axial end 142 to balance with pressure at the second axial end 144. For example, a high pressure at the first inlet/outlet 112 port (shown best in FIG. 7) may exert substantially the same force in the first longitudinal direction as the second longitudinal direction. In an embodiment, pressure at the first inlet/outlet exerts a force in the first longitudinal direction that is equal to a force in the second longitudinal direction.

The valve 18 may be any suitable balanced-type valve that fluidly connects the first axial end 142 to the second axial end 144 of the valve member 138. For example, valve member 138 may include a flow path that extends from the first axial end 142 to the second axial end 144. The flow path allows fluid to flow through the valve member 138 to equalize pressure at both ends 142 and 144. For example, when the valve member moves between an open position and a closed position fluid may flow from the first axial end 142 to the second axial end 144, or vice versa.

The back end 134 of the valve 18 may include a pressure sense port 230 in the valve housing 110. The pressure sense port 230 may be fluidly connected to a flow path 238 of the valve member 138 to receive internal pressure of the valve 18. For example, the pressure sense port 230 may extend axially from the back end 134 to the flow path 238.

The pressure sense port 230 may be adjacent to the electrical connectors 94 to allow the pressure sense port 230 and the electrical connectors 94 to assemble into a hydraulic system quickly and easily. For example, the pressure sense port 230 and the electrical connectors 94 may be aligned with and simultaneously connected to the nipple 90 and the power receptacles 84 by axially moving the valve 18, as shown in FIG. 2 for the valve 20. In an embodiment, the pressure sense port is not provided.

The valve 18 may include a removable wall 232 to close the pressure sense port 230. Closing the pressure sense port allows the valve 18 to retain internal pressure when the valve 18 may be used without the corresponding pressure sensor 92 (shown schematically in FIG. 3). For example, the valve 18 may include an axially facing groove that houses a seal, such as an o-ring 234, to seal against the removable wall 232. The removable wall 232 may be held in place by a retaining ring 236 that is fixed to the back end 134 of the valve 18.

The removable wall 232 may be removed to open the pressure sense port 230. For example, the retaining ring 236 may be removed from the back end 134 and the removable wall 232 may be moved away from the o-ring 234 to allow the pressure sensor 92 (shown schematically in FIG. 3) to fluidly connect to the flow path 233 through the pressure sense port 230.

The valve member 138 may include a radially outwardly extending skirt 250 that circumscribes the longitudinal axis A. The skirt 250 may be disposed axially between a valve seat engaging surface, such as the lobe end 160 or the flanges 170 or 178, and the second axial end 142 of the valve member 138. The skirt 250 may extend radially from a radially outer portion of the inwardly extending flange 178 and from the radially outwardly facing surface 216 to form a flange that circumscribes the longitudinal axis A. For example, the skirt 250 may extend directly radially outward.

The skirt may be any suitable shape. For example, a radially outward portion of the skirt may be tapered. In an embodiment, the skirt may include a concavity that faces axially toward the valve seat surface.

The skirt 250 may be axially offset from the lobe end 160 a distance that is based on the size of the valve 18 and/or the desired flow rate of the valve 18.

The valve member 138 may include an axially extending nose 260 that defines a portion of the flow path 233 that extends from an opening 262 in the first axial end 142 towards the second axial end 144. The portion of the flow path 233 of the nose 260 may fluidly connect the first inlet/outlet 112 to the second axial end 144 of the valve member 138 through remainder of the flow path 233. For example, the nose 260 may be a cylindrical portion of the front end body 150 that extends axially beyond the valve housing 110 to offset the opening 262 of the flow path 233 beyond a focal point F (shown in FIG. 6) of the first inlet/outlet 112.

The nose 260 may have an axial length or a radial width that is based on the size of the valve 18 and/or the desired flow rate of the valve 18. For example, less than 50% of the nose 260 may extend beyond the focal point F, and the opening 262 may have a diameter that is less than 25% a diameter of the first inlet/outlet 112. In an embodiment, more than 50% of the nose may extend beyond the focal point F.

As shown in FIG. 6, the focal point F may be centrally disposed in the first inlet/outlet 112. For example, the focal point F may be defined by an intersection of imaginary projection lines that extend along flow paths formed between the valve member and the valve seat surface. The imaginary projection lines may form a conical shape that is concentric with the longitudinal axis A and that has a tip that is coextensive with the focal point.

Referring again to FIG. 5, the portion of the flow path 233 may have a cross-sectional area that is less than an adjacent portion of the flow path 233. For example, the portion may be cylindrical with a diameter that is less than a diameter of a central portion 264 of the flow path 233 that is formed by the front end body 150 and/or the rear end body 152. The cross-sectional area of the portion compared to the central portion of the flow path may be based on the size of the valve 18 and/or the desired flow rate of the valve 18.

The nose 260 may extend axially away from the second axial end 144 of the valve member 138 such that when air is flowing from the second inlet/outlet 114 to the first inlet/outlet 112, the opening 262 of the flow path 233 is disposed in a low pressure zone beyond the first inlet/outlet 112. For example, a high pressure at the second inlet/outlet 114 may cause a high pressure zone to form near the focal point F just after the valve member 138 is opened (shown best in FIG. 6). Offsetting the opening 262 of the flow path 233 from the high pressure zone allows the flow path 233 to be exposed to a low pressure zone, which may prevent the flow path 233 from receiving high pressure just after the valve member 138 is opened.

The valve 18 may include a solenoid 270 that is operably coupled to the valve member 138 to actuate the valve member 138 between the open position and the closed position. For example, the rear end body 152 may include—or may be entirely made of—a magnetic material that moves when the solenoid is energized.

The electrical connectors 94 may operably connect to the solenoid to energize the solenoid. For example, the controller 16 (shown in FIG. 3) may provide electrical power to the electrical connectors 94 to actuate the valve member 138 between the open or closed position.

When the valve member 138 is in the closed position (shown in FIG. 3), the first inlet/outlet 112 and the second inlet/outlet 114 are fluidly disconnected. The valve member 138 may move a distance B (labeled in FIG. 3) from the closed position to reach the open position shown in FIG. 5. When the valve member is in the open position, the first inlet/outlet 112 and the second inlet/outlet 114 are fluidly connected.

The valve may include a resilient member 272 that biases the valve member 138 toward the valve seat surface 132. The resilient member 272 may extend from a ledge of the valve housing 110 to a ledge of the rear end body 152. For example, the resilient member 272 may circumscribe the longitudinal axis A and extend from the ledge of the valve housing 110 to a central portion 274 of the rear end body 152.

The resilient member 272 may be a coil spring that is in a compressed state when the valve member 138 is in the open position so that the valve member 138 is biased toward the closed position. When the valve member 138 is in the closed position, the coil spring may be in a compressed state so that the valve member 138 is biased to remain in the closed position until a threshold force above zero pounds is applied to open the valve member 138.

Referring now to FIG. 6, the nose 260 may allow the valve member 138 to open more easily when the second inlet/outlet 114 has a higher pressure than the first inlet/outlet 112. For example, when the valve member 138 opens and a fluid axially between the skirt 250 and the second axial end 144 (shown in FIG. 5) has a pressure that is higher than a pressure of fluid within the portion of the flow path 233 defined by the nose 260, a high pressure zone forms about the nose 260. The high pressure zone is represented by a high concentration of large dots adjacent the nose 260.

The portion of the flow path 233 may open outside of the high pressure zone to receive lower pressure fluid from a low pressure zone. For example, the low pressure zone may be axially beyond the high pressure zone and may be adjacent the opening 262 in the nose 260.

Receiving the lower pressure may prevent an increase in the amount of force needed to open the valve member 138, when the valve member 138 is first opened. For example, the nose 260 may delay equalization of pressure within the flow path 233 and the second inlet/outlet 114 when the valve member 138 is first opened. Delaying the equalization may allow the valve member 138 to more fully open before the pressure within the flow path 233 raises to increase a closing force on the valve member 138.

Referring now to FIG. 7, the skirt 250 may allow the valve member to open more easily when the first inlet/outlet 112 has a higher pressure than the second inlet/outlet 114. For example, when the valve member 138 opens and a pressure at the second inlet/outlet 114 is lower than a pressure at the first inlet/outlet 112, a high pressure zone may form adjacent the skirt 250. The high pressure zone is represented by a high concentration of large dots adjacent the skirt 250.

The high pressure zone may form axially between the skirt 250 and the valve seat surface 132 to reduce an amount of force needed to open the valve member 138. For example, the skirt 250 may delay equalization of pressure within the second the second inlet/outlet 114 when the valve member 138 is first opened. Delaying the equalization may allow the valve member 138 to more fully open before the pressure adjacent the skirt 250 opposite the valve seat surface 132 raises to increase a closing force on the valve member 138.

Figure 8:
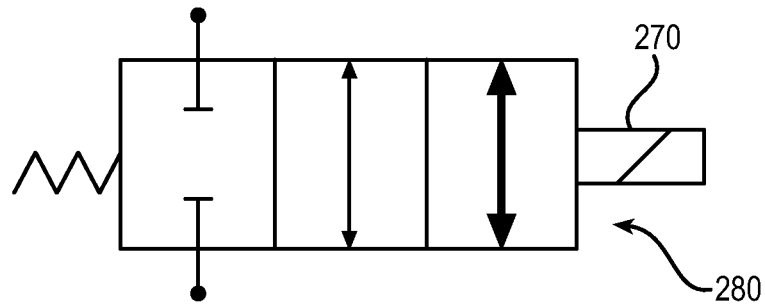
FIG. 8 is a schematic view of another exemplary valve having more than two states, in a closed state.
Figure 9:
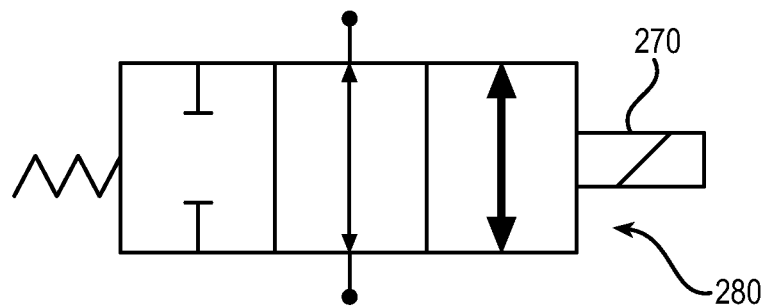
FIG. 9 is a schematic view of the valve of FIG. 8 in an intermediately-open state.
Figure 10:
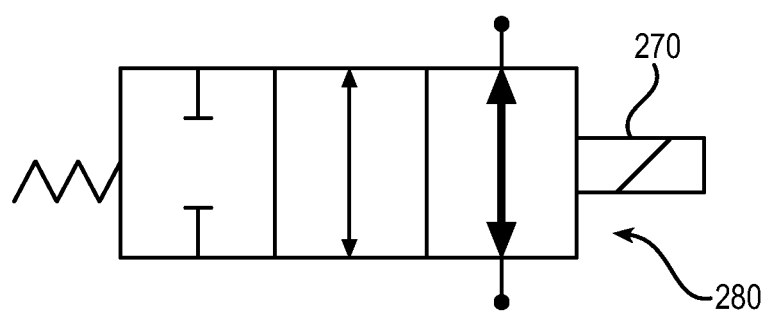
FIG. 10 is schematic view of the valve of FIG. 8 in a second open state.

Turning now to FIGS. 8-10, different operational states of a valve are schematically shown at 280. The valve 280 structurally may be substantially the same as the above-referenced valves 18 or 20. In addition, the foregoing description of the valve 18 or 20 is equally applicable to the valve 280 except as noted below. Moreover, it will be appreciated that aspects of the valves may be substituted for one another or used in conjunction with one another where applicable.

FIG. 8 schematically illustrates the valve 280 in a closed state, FIG. 9 schematically illustrates the valve 280 in an intermediately-open state that allows fluid flow through the valve 280, and FIG. 10 schematically illustrates the valve in a second open state that allows fluid flow through the valve 280. The intermediately-open state may allow a lower fluid rate compared to the second open state. For example, the valve 280 may be partially open in the intermediately-open state and may be fully open when in the second open state.

The valve 280 may include a solenoid 270 that may operate the valve into the closed state, the intermediately-open state, and the second open state. The solenoid may be configured to provide a first force at a first input wattage to actuate the valve 280 into the intermediately-open state, and may be configured to provide a second force at a second input wattage to actuate the valve 280 into the second open state. For example, the first input wattage may be anywhere from eight to twelve watts and the second input wattage may be anywhere from sixteen watts and above.

Figure 11:
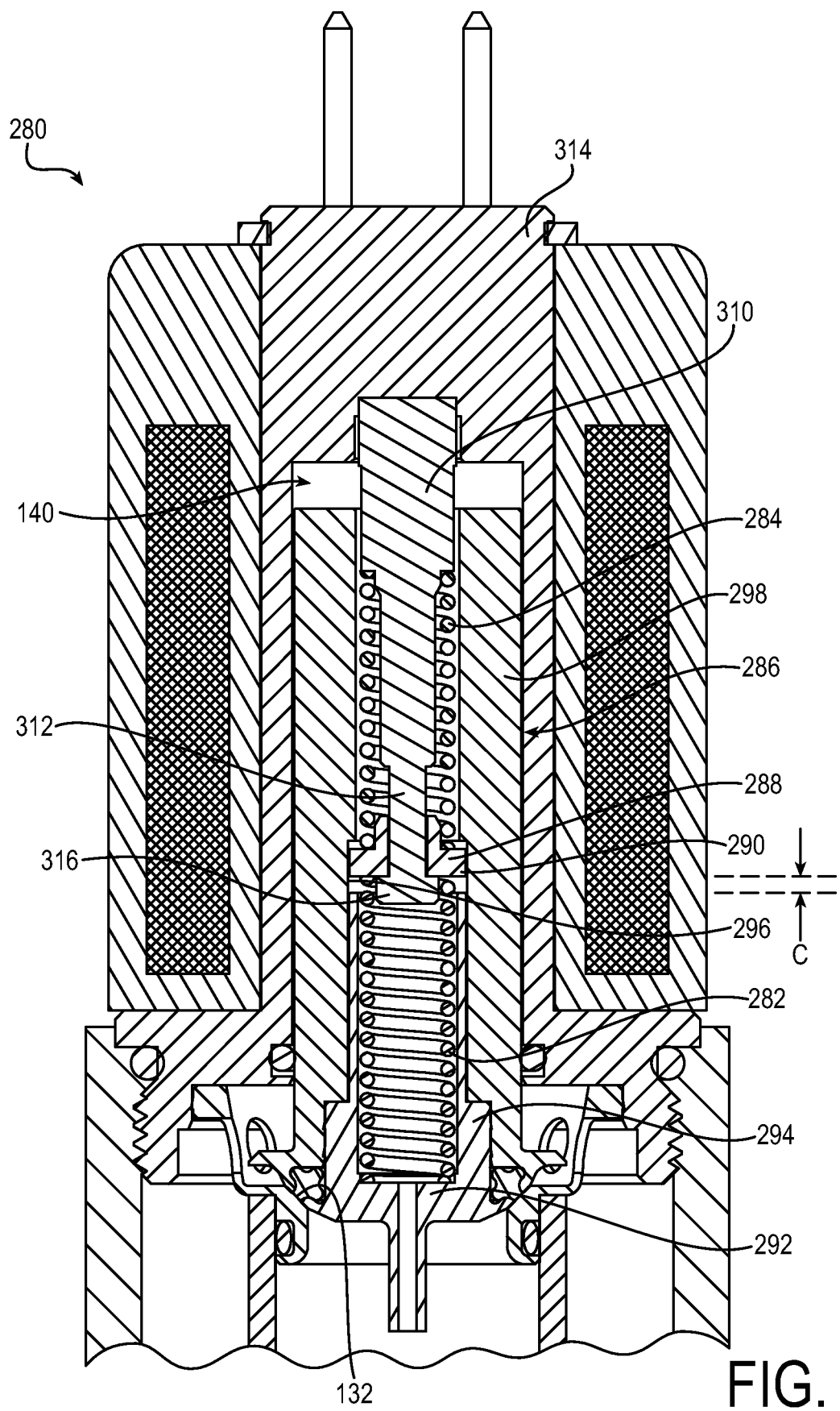
FIG. 11 is a cross-sectional view of the valve of FIG. 8 in the closed state.
Figure 12:
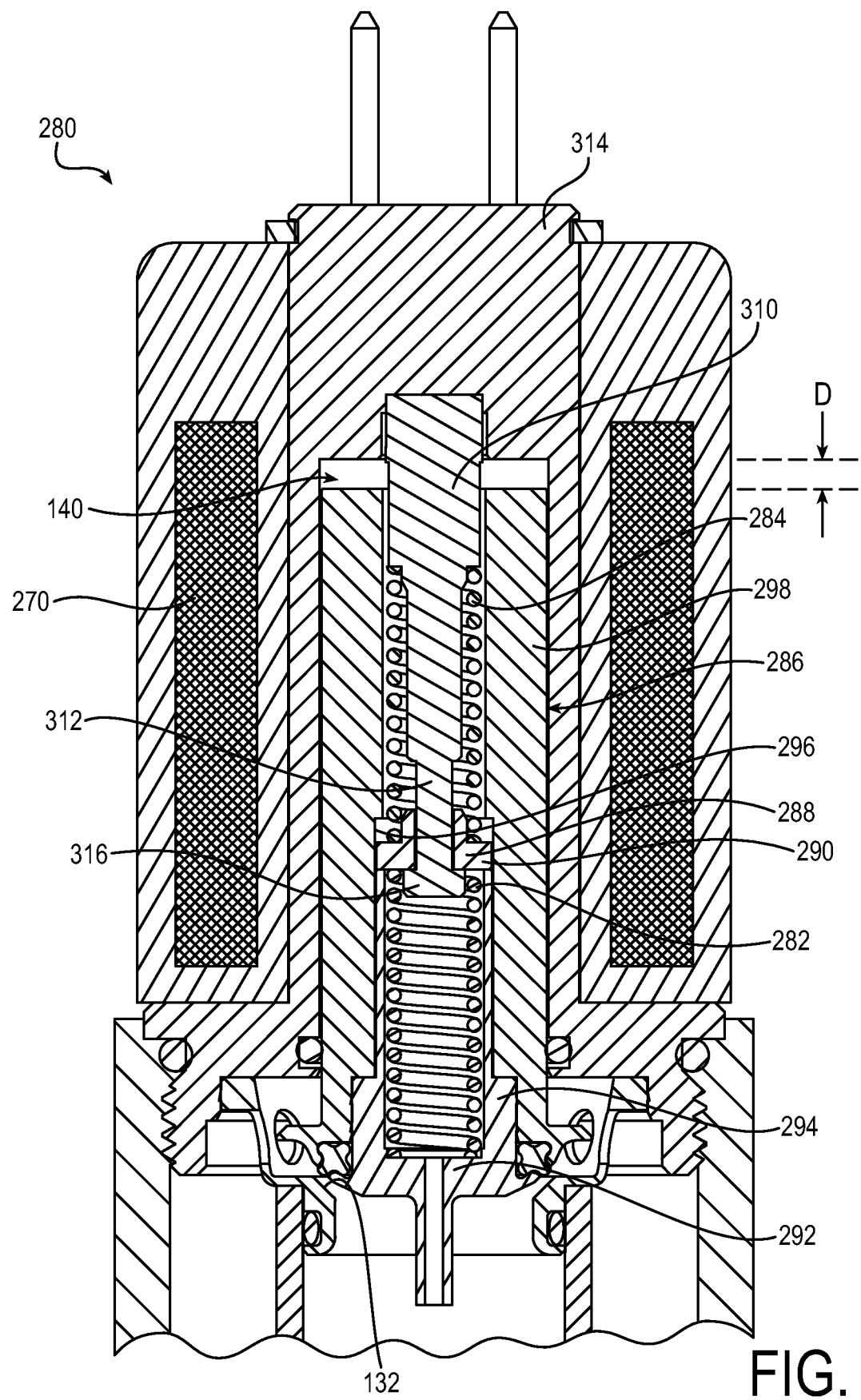
FIG. 12 is a cross-sectional view of the valve of FIG. 8 in the intermediately-open state.
Figure 13:
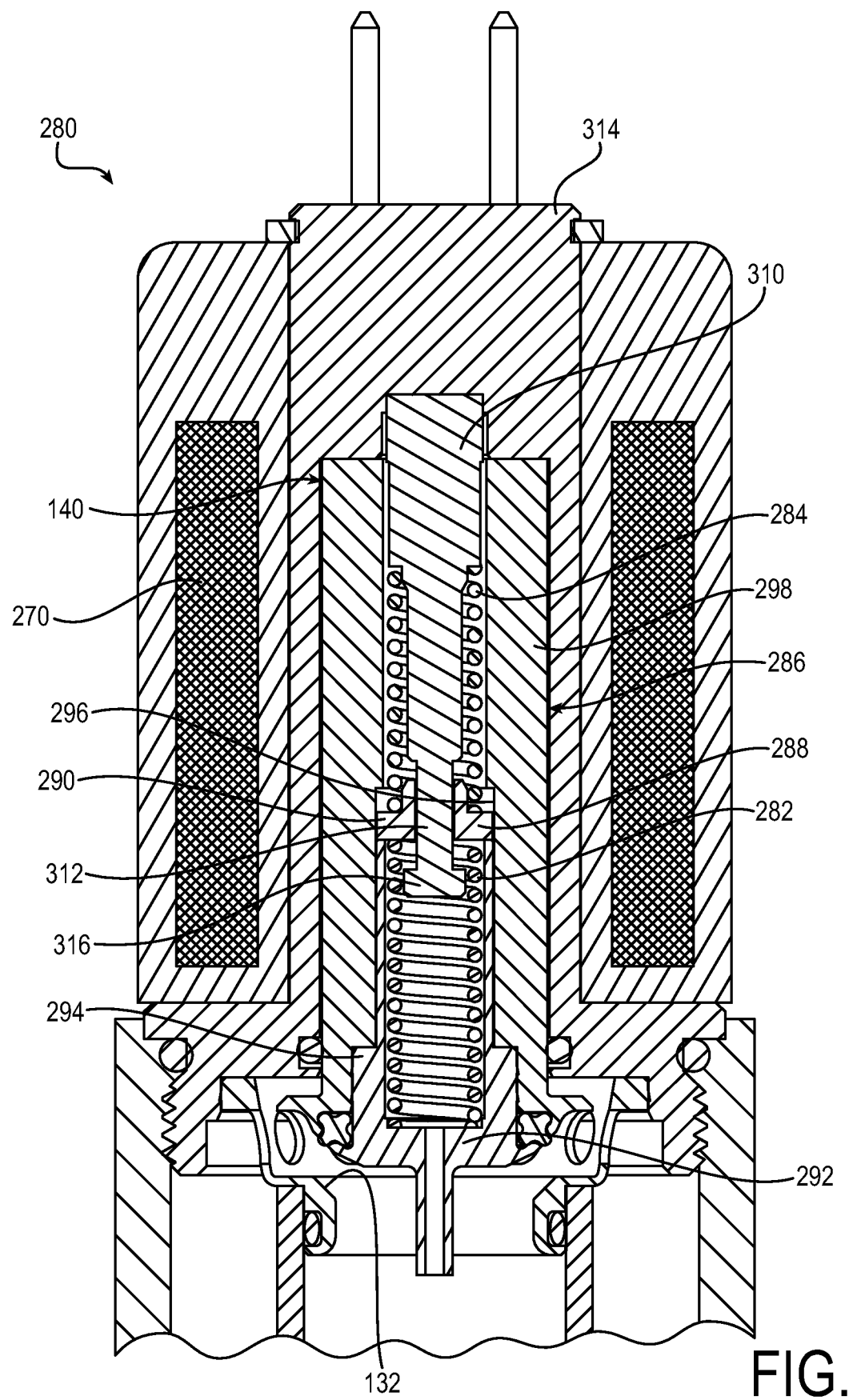
FIG. 13 is a cross-sectional view of the valve of FIG. 8 in the second open state.

Referring now to FIGS. 11-13, a progression of the valve 280 opening is illustrated. FIG. 11 illustrates, the valve 280 in the closed state where fluid is prevented from flowing through the valve 18. FIG. 12 illustrates the valve 280 in the intermediately-open state where fluid is allowed to flow through the valve 280. FIG. 13 illustrates the valve 280 in the second open state where fluid is allowed to flow through the valve 280 at a greater flow rate compared to when the valve 280 is in the intermediately-open state.

The same reference numerals are used to denote structures corresponding to similar structures in the valve 280 and the valves 18 and 20. The valve 280 may include a first resilient member 282 and a second resilient member 284. The first resilient member 282 may have a lower preload force than the second resilient member 284. For example, the first resilient member 284 may have a preload of 2 to 2.5 pounds and the second resilient member may have a preload of 4 to 4.5 pounds. In an embodiment, the preload of the second resilient member 284 may be anywhere from 50% to 100% greater than the preload of the first resilient member 282.

The resilient members 282 and 284 may have a spring constant of anywhere from 2-30 pounds per inch (lb/in). In an embodiment, each resilient member may have a spring constant of anywhere from 20-30 lb/in.

The first resilient member 282 may bias a valve member 286 toward a valve seat surface 132. For example, the valve 280 may include an axially moveable body 288 with a radially outwardly extending flange 290 forming a first axially facing surface engaged with an end of the first resilient member 282. The first resilient member 282 may extend from a ledge 292 of a front end body 294 of the valve member 286 to the radially outwardly extending flange 290. For example, the first resilient member 282 may circumscribe the longitudinal axis A and extend from the ledge of the front end body 294 to the radially outwardly extending flange 290.

The first resilient member 282 may be a coil spring that is in a compressed state when the valve member 286 is in the intermediately-open position or the fully open position so that the valve member 286 is biased toward the closed position. When the valve member 286 is in the closed position, the coil spring may be in a compressed state so that the valve member 286 is biased to remain in the closed position.

The radially outwardly extending flange 290 may be slidable against a radially inwardly facing surface 296 of a rear end body 298 to be engageable with the front end body 294. For example, an axially extending portion of the front end body 294 may be coaxial with the axially moveable body 288 and abut the radially inwardly facing surface 296 of the rear end body 298.

The valve 280 may include a support post 310 that includes a guide rail 312. For example, the axially moveable body 288 may include a through hole to allow the axially moveable body 288 to slide along the guide rail 288. The axially moveable body 288 may not circumscribe the longitudinal axis A. For example, the axially moveable body 288 may include a notch (not shown) that is as wide or wider than the guide rail 288 to allow the axially moveable body 288 to be assembled laterally onto the guide rail 288. In an embodiment, the support post may be made of more than one piece and the axially moveable body may be assembled onto the guide rail before every piece of the support post is assembled. Alternatively, the axially moveable body may be flexible to allow the through hole to expand to assemble axially onto the support post to reach the guide rail.

The support post 310 may extend along the longitudinal axis A from an axial end of a piston chamber 140 toward a first axial end 142 of the valve body 286. For example, the support post 310 may be fixed to a valve housing 314 and extend to a central portion of the valve member 286.

The axially moveable body 288 may have a second axially facing surface, that faces opposite the first axially facing surface, to engage an end of the second resilient member 284. The second resilient member 284 may extend from a ledge of the support post 310 to the radially outwardly extending flange 290. For example, the resilient member 284 may circumscribe the longitudinal axis A and extend from a ledge of the support post 310 to the radially outwardly extending flange 290.

The second resilient member 284 may be a coil spring that is in a compressed state when the valve member 286 is in the fully open position so that the valve member 286 is biased toward the closed position by the second resilient member 284. For example, the axially moveable body 288 may compress the coil spring when in the fully open position.

The support post 310 may include an axial stop 316 to limit axial movement of the axially moveable body 288 toward the front body 294. For example, the axial stop may be a flange at an end of the support post 310.

The second resilient member 284 may be in a compressed state when the valve member 286 is in the closed position and the axial stop 316 may prevent the axially moveable body 288 from allowing the second resilient member 284 to decompress. For example, the axially moveable body 288 may abut the axial stop 316 when the valve member 286 is in the closed position. The second resilient member 284 may be in a compressed state so that the valve member 286 is biased to close while in the intermediately-open position until a threshold force above the force required to hold the valve member 286 in the intermediately-open position is applied to more fully open the valve member 286. In an embodiment, the valve includes a pressure sense port and/or a removable pressure wall. For example, the valve may include a central through hole may extend through the back end of the valve to fluidly connect the pressure sense port to the internal pressure of the valve.

Referring now to FIG. 12, when the first input wattage is provided to the solenoid 270, the valve member 286 may move into the intermediately-open position. For example, the solenoid 270 may provide a force of 3 pounds to compress the first resilient member 282 when the first input wattage is provided.

The valve member 286 may move until the end of the front end body 294 engages the radially outwardly extending flange 290. The valve member 286 may move a distance C (labeled in FIG. 11) from the closed position to reach the intermediately-open position. When in the intermediately-open position the valve member 286 may be spaced from the valve seat surface 132 less than 50% a distance that the valve member 286 is spaced from the valve seat surface 132 when in the second open position (shown in FIG. 13).

When the front end body 294 engages the first axially facing surface of the axially moveable body 288, the first resilient member 282 may not axially compress further when the valve member 286 is advanced further toward the second open position. For example, the axially moveable body may move with the front end body 294 when the valve member 286 opens beyond the intermediately-open position.

Referring now to FIG. 13, when the second input wattage is provided to the solenoid 270, the valve member 286 may move into the second open position. For example, the valve member 286 may move until a piston portion of the valve member 286 engages an axially facing surface of the valve housing 314. The valve member 286 may move a distance D (labeled in FIG. 12) from the intermediately-open position to reach the second open position.

The valve member 286 may compress the second resilient member 284 when the valve member moves from the intermediately-open position to the second open position. For example, the solenoid 270 may provide a force of 5 pounds to provide an increase of about 67% above the force provided when the first input wattage is provided.

When the second resilient member 284 begins to be compressed by the rear end body 298, the force needed to continue to open the valve member 286 may abruptly increase. For example, the second resilient member 284 may be stiffer than the first resilient member 282 and/or the second resilient member 284 may be pre-compressed when the valve member 286 is in the closed position (as shown in FIG. 11).

Figure 14:
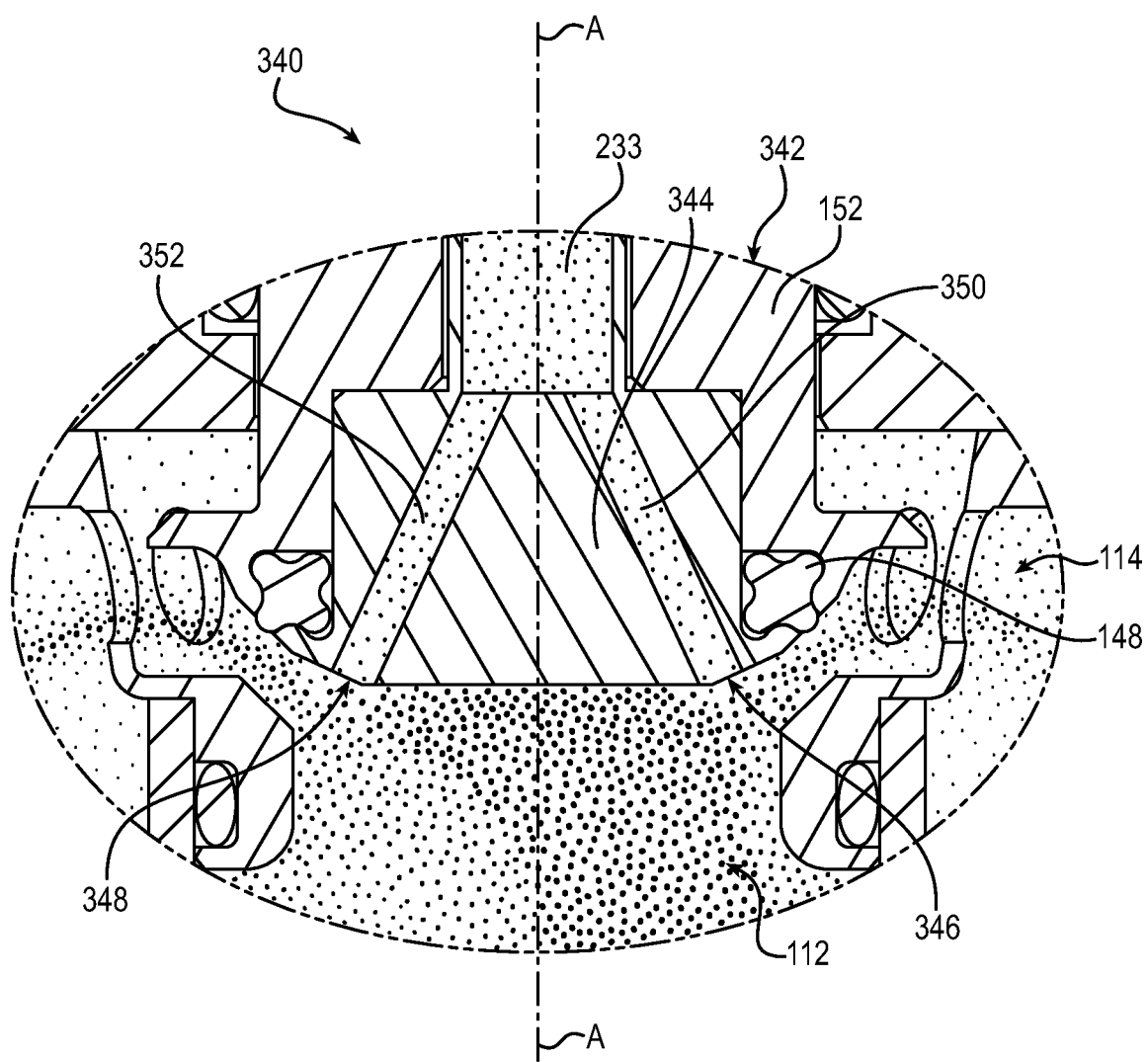
FIG. 14 is an enlarged view of the cross-sectional view of a pressure pick-up opening of yet another exemplary valve in a partially open state.

Turning now to FIG. 14, an exemplary embodiment of the valve is shown at 340 in a state just after partially opening. The valve 340 structurally may be substantially the same as the above-referenced valves 18, 20, or 280. In addition, the foregoing description of the valves 18, 20, or 280 is equally applicable to the valve 340 except as noted below. Moreover, it will be appreciated that aspects of the valves may be substituted for one another or used in conjunction with one another where applicable.

The valve 340 includes first inlet/outlet 112, a second inlet/outlet 114, and a valve member 342. The valve member may include a front end body 344 and a rear end body 152. The front end body 344 may include a first pressure pick-up opening 346 and or a second pressure pick-up opening 348 that is adjacent to a valve seat engaging portion (e.g., a lobe end 160) of a valve seal 148. The pressure pick-up openings 346 and 348 may be disposed adjacent to the lobe end 160 such that the pressure pick-up openings 346 and 348 are exposed to relatively low pressure from the first inlet/outlet 112 compared to a highest pressure present in the first inlet/outlet 112. For example, when a pressure at the first inlet/outlet 112 is greater than a pressure at the second inlet/outlet 114 and the valve member 342 opens—as illustrated in FIG. 14—the pressure pick-up openings 346 and 348 are exposed to pressure that is less than the highest pressure present in the first inlet/outlet 112 (e.g., present in a central portion of the first inlet/outlet 112).

The pressure pick-up openings 346 and 348 may be radially offset from a longitudinal axis A that is coaxial with the valve member 342 and may be fluidly connected to a second axial end (e.g., the second axial end 144 shown in FIG. 3) of the valve member 342. The pressure pick-up openings 346 and 348 may be fluidly connected to a corresponding pick-up flow path 350 or 352 that are each fluidly connected to the second axial end of the valve member 342 through a flow path 233 of the valve member 342.

The pick-up flow path 350 may extend axially toward the second axial end of the valve member 342 through the front end body 344 from the pressure pick-up opening 346 at an angle toward the longitudinal axis A. The pick-up flow path 350 may be a drilled hole.

The pick-up flow path 352 may be identical to the pick-up flow path 350. In an embodiment, more than two pick-up flow paths fluidly connect more than two corresponding pressure pick-up openings to the flow path of the valve member. In another embodiment, only one pick-up flow path connects a single pressure pick-up opening to the flow path of the valve member.

Each pressure-pick-up opening 346 and 348 may reduce power consumption of a solenoid (e.g., the solenoid 270 shown in FIG. 5) of the valve 340 that is operably coupled to the valve member 342 to open and close the valve member 342. When a pressure at the first inlet/outlet 112 is greater than a pressure at the second inlet/outlet 114 and the valve member 342 opens, the pressure at the second axial end (e.g., the second axial end 144 shown in FIG. 3) of the valve member 342 may reduce below the highest pressure in the first inlet/outlet 112. For example, the pressure-pick-up openings 346 and 348 may be exposed to reduced pressure adjacent to the valve seat engaging portion (e.g., the lobe end) when the valve member 342 opens, thereby allowing a pressure reduction in the pick-up flow paths 350 and 352, in the flow path 233, and at the second axial end of the valve member 342. The reduced pressure at the second axial end reduces a closing force caused by the pressure and in turn reduces an opening force required for the solenoid to open the valve member 342.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A valve including:
   a valve housing including a first port and a second port, wherein the first port acts as one of an inlet or an outlet and the second port acts as the other of the inlet or the outlet;
   a valve seat having a valve seat surface that circumscribes a longitudinal axis;
   a valve member that is moveable along the longitudinal axis, wherein the valve member includes a first axial end that faces the valve seat surface and a second axial end that faces away from the first axial end, wherein when the valve member is in an open position, the first port and the second port are fluidly connected, and when the valve member is in a closed position, the first port and the second port are fluidly disconnected;
   a cavity that is defined by the first axial end facing toward the valve seat surface;
   a self-energizing sealing member that circumscribes the longitudinal axis, wherein the sealing member includes a base portion and a lobe extending from the base portion at an angle relative to the longitudinal axis, wherein the lobe engages against the valve seat surface to seal against the valve seat surface when the valve member is in the closed position, and wherein the base portion is at least partially disposed within the cavity and includes a lobe end that is a portion of the lobe that extends beyond the cavity;
   wherein when the valve member is in the open position a length of the base portion perpendicular to the valve seat surface is greater than a length of the lobe end perpendicular to the valve seat surface; and
   a pressure sense port in the valve housing, wherein the pressure sense port is axially opposite the first axial end of the valve member and is fluidly connected to a flow path of the valve member that extends from the first axial end toward the second axial end to allow fluid to flow through the valve member when the valve member moves between the open position and the closed position.

2. The valve of claim 1, wherein the valve member includes:
   a rear end body; and
   a front end valve body disposed within the rear end body, wherein the front end body and the rear end body together define the cavity.

3. The valve of claim 1, wherein the cavity circumscribes the longitudinal axis, faces radially away from the longitudinal axis, and faces axially toward the valve seat surface.

4. The valve of claim 1, wherein the valve member includes:
   a radially outwardly extending flange that circumscribes the longitudinal axis at an angle and is formed in the first axial end, wherein the radially outwardly extending flange at least partially defines a first seal retaining portion of the cavity that extends tangential to the valve seat surface toward the longitudinal axis; and
   a radially inwardly extending flange that circumscribes the longitudinal axis at an angle and is formed in the first axial end, wherein the radially inwardly extending flange at least partially defines a second seal retaining portion of the cavity that extends tangential to the valve seat surface and away from the first seal retaining portion, and wherein the radially inwardly extending flange extends toward the radially outwardly extending flange to define a slit that circumscribes the longitudinal axis and extends perpendicular to the to the valve seat surface;
   wherein the base portion is disposed within the cavity adjacent to the radially outwardly extending flange and the radially inwardly extending flange, and the lobe end protrudes from the first axial end toward the valve seat surface.

5. The valve of claim 4, wherein the first seal retaining portion extends radially inwardly from the slit to receive a portion of the base portion, and wherein the second seal retaining portion extends axially from the slit to receive another portion of the base portion.

6. The valve of claim 4, wherein the cavity and the slit together form a spade-shaped cross-section.

7. The valve of claim 4, wherein each flange includes an annular protrusion that extends away from the valve seat surface to engage a corresponding concave surface of the base portion.

8. The valve of claim 4, wherein the cavity includes an intermediate annular seal retaining portion that extends radially inward of the second seal retaining portion, and extends axially away from the first seal retaining portion toward the second axial end of the valve member.

9. The valve of claim 1, wherein the base portion includes a radially inner lobe and a radially outer lobe that extend opposite one another, and wherein the lobe extends perpendicular to the radially inner lobe and/or the radially outer lobe at an incline to the longitudinal axis.

10. The valve of claim 1, wherein the sealing member is an x-ring seal.

11. The valve of claim 1, wherein the valve member includes:
a radially outwardly extending skirt that circumscribes the longitudinal axis and is disposed axially between a valve seat engaging surface of the first axial end and the second axial end of the valve member, whereby when a pressure at the second port is lower than a pressure at the first port, and the valve member opens, a high pressure zone forms adjacent the skirt axially between the skirt and the valve seat surface to reduce an amount of force needed to open the valve member.

12. The valve of claim 1, wherein the valve member includes:
an axially extending nose that defines a flow path that extends from an opening in the first axial end towards the second axial end to allow fluid to flow within the nose, and the nose extends axially away from the second axial end of the valve member beyond a focal point, wherein a focal point is defined by an intersection of imaginary projection lines that extend along flow paths formed between the valve member and the valve seat surface;
whereby when a fluid within the second port has a pressure that is higher than a pressure of fluid within the flow path defined by the nose, and the valve member opens, a high pressure zone forms in the first port about the nose and the flow path receives lower pressure fluid from a low pressure zone that is axially beyond the high pressure zone and that is adjacent the opening in the nose to reduce an amount of force needed to open the valve member.

13. The valve of claim 1, further including a solenoid that is operably coupled to the valve member, wherein the open position is an intermediately-open position and the valve member is moveable from the closed position to the intermediately-open position and from the intermediately-open position to a second open position that is further from the valve seat surface than the intermediately-open position;
a first resilient member that biases the valve member toward the valve seat surface; and
a second resilient member that biases the valve member toward the valve seat surface when the valve member is between the intermediately-open position and the second open position;
wherein when the valve member is in the intermediately-open position, the second resilient member compresses as the valve member moves toward the second open position, thereby causing an abrupt increase in force needed to advance the valve member toward the second open position.

14. The valve of claim 1, wherein the valve member further includes a pressure pick-up opening, whereby when a pressure at the first port is greater than a pressure at the second port and the valve member opens the pressure pick-up opening is exposed pressure that is less than the highest pressure present in the first port.

15. A valve including:
a valve housing including a first port and a second port, wherein the first port acts as one of an inlet or an outlet and the second port acts as the other of the inlet or the outlet;
a valve seat having a valve seat surface that circumscribes a longitudinal axis; and
a valve member that is moveable along the longitudinal axis, wherein the valve member includes a first axial end that faces the valve seat surface and a second axial end that faces away from the first axial end, wherein when the valve member is in an open position, the first port and the second port are fluidly connected, and when the valve member is in a closed position, the first port and the second port are fluidly disconnected;
wherein the valve member includes:
a radially outwardly extending skirt that circumscribes the longitudinal axis and is disposed axially between a valve seat engaging surface of the first axial end and the second axial end of the valve member, whereby when a pressure at the second port is lower than a pressure at the first port, and the valve member opens, a high pressure zone forms adjacent the skirt axially between the skirt and the valve seat surface to reduce an amount of force needed to open the valve member.

16. A valve including:
a valve housing including a first port and a second port, wherein the first port acts as one of an inlet or an outlet and the second port acts as the other of the inlet or the outlet;
a valve seat having a valve seat surface that circumscribes a longitudinal axis; and
a valve member that is moveable along the longitudinal axis, wherein the valve member includes a first axial end that faces the valve seat surface and a second axial end that faces away from the first axial end, wherein when the valve member is in an open position, the first port and the second port are fluidly connected, and when the valve member is in a closed position, the first port and the second port are fluidly disconnected;
wherein the valve member includes:
an axially extending nose that defines a flow path that extends from an opening in the first axial end towards the second axial end to allow fluid to flow within the nose, and the nose extends axially away from the second axial end of the valve member beyond a focal point, wherein the focal point is defined by an intersection of imaginary projection lines that extend along flow paths formed between the valve member and the valve seat surface;
whereby when a fluid within the second port has a pressure that is higher than a pressure of fluid within the flow path defined by the nose, and the valve member opens, a high pressure zone forms in the first port about the nose and the flow path receives lower pressure fluid from a low pressure zone that is axially beyond the high pressure zone and that is adjacent the opening in the nose to prevent an increase in the amount of force needed to open the valve member.

17. The valve of claim 16, wherein the focal point is centrally disposed in the first port.

18. A central tire inflation system including:
- a control system including the valve according to claim 1 and a fluid flow line fluidly connected to the first port or the second port of the valve;
- a fluid reservoir that is fluidly connectable to an outlet of the control system; and
- a pressure source with an outlet fluidly connected to an inlet of the control system.

19. The central tire inflation system of claim 18, further including a controller for controlling the control system and the pressure source; wherein the valve includes one or both of: a supply valve in communication with the controller and fluidly connected to a wheel valve, wherein an inlet of the supply valve is fluidly connected to the pressure source; and a vent valve in communication with the controller and fluidly connected with the wheel valve, wherein opening the vent valve fluidly connects the wheel valve with ambient air, thereby allowing the fluid reservoir to deflate to ambient air when the wheel valve and the vent valve are open; and wherein the pressure source includes: a fluid pump with an intake port for receiving ambient air; a cooler with an inlet fluidly connected to an outlet of the pump; an air dryer with an inlet fluidly connected to an outlet of the cooler; a system reservoir with an inlet fluidly connected to an outlet of the air dryer, wherein the system reservoir has an outlet fluidly connected to the inlet of the supply valve, and wherein when the system reservoir holds pressurized fluid the pressurized fluid is provided to the wheel valve when the supply valve is open, thereby providing pressurized fluid from the system reservoir to the fluid reservoir when the wheel valve and the supply valve are open.

\* \* \* \* \*